(12) United States Patent
Suzuki et al.

(10) Patent No.: US 10,651,765 B2
(45) Date of Patent: May 12, 2020

(54) MOTOR CONTROLLER, IMAGE FORMING APPARATUS AND MOTOR CONTROLLING METHOD

(71) Applicant: Konica Minolta, Inc., Chiyoda-ku, Tokyo (JP)

(72) Inventors: Daichi Suzuki, Toyokawa (JP); Yuta Tachibana, Toyokawa (JP); Hiroyuki Yoshikawa, Toyohashi (JP); Yasuhiro Koide, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 94 days.

(21) Appl. No.: 15/888,934

(22) Filed: Feb. 5, 2018

(65) Prior Publication Data

US 2018/0234037 A1 Aug. 16, 2018

(30) Foreign Application Priority Data

Feb. 14, 2017 (JP) .................................. 2017-025086

(51) Int. Cl.
*H02P 6/08* (2016.01)
*H02P 6/28* (2016.01)
(Continued)

(52) U.S. Cl.
CPC .................. *H02P 6/08* (2013.01); *H02P 6/17* (2016.02); *H02P 6/18* (2013.01); *H02P 6/28* (2016.02);
(Continued)

(58) Field of Classification Search
USPC .................................................... 318/400.13
See application file for complete search history.

(56) References Cited

U.S. PATENT DOCUMENTS 7,973,500 B2 * 7/2011 Yamada ................. B60K 6/445
318/376
9,586,484 B2 * 3/2017 Li ............................. H02P 6/16

FOREIGN PATENT DOCUMENTS

EP 1 981 166 A1 10/2008
EP 3 010 140 A1 4/2016
(Continued)

OTHER PUBLICATIONS

Zhaodong Feng et al: "Extrapolation Technique for Improving the Effective Resolution of Position Encoders in Permanent-Magnet Motor Drives", vol. 13, No. 4, Aug. 1, 2008 (Aug. 1, 2008), pp. 410-415, XP011345232, (Year: 2008).*

(Continued)

*Primary Examiner* — Jorge L Carrasquillo
(74) *Attorney, Agent, or Firm* — Squire Patton Boggs (US) LLP

(57) ABSTRACT

A motor controller includes: a velocity calculation unit for obtaining an angle θ(n), which shows a rotation position, and an angular velocity ω(n) of a rotor at a time point n; a compensation amount calculation unit for calculating a compensation angle Δθ by which the rotor advances from the time point n to a (n+1)th control cycle (a control cycle starting from a time point n+1), based on an angular acceleration a(n) of the rotor, an angular velocity ω(n) of the rotor at the time point n and a time length T of the control cycle; and a PWM inverter for controlling a voltage to be applied to a coil such that a rotating magnetic field based on a rotation position of the rotor advanced by the compensation angle Δθ from the rotation position of the rotor at the time point n is formed in the (n+1)th control cycle.

18 Claims, 16 Drawing Sheets

(51) Int. Cl.
*H02P 27/08* (2006.01)
*H04N 1/00* (2006.01)
*H02P 21/18* (2016.01)
*H02P 6/18* (2016.01)
*H02P 6/17* (2016.01)

(52) U.S. Cl.
CPC .............. *H02P 21/18* (2016.02); *H02P 27/08* (2013.01); *H04N 1/00928* (2013.01); *H04N 2201/0082* (2013.01)

(56) References Cited

FOREIGN PATENT DOCUMENTS

| | | | | |
|---|---|---|---|---|
| EP | 3010140 A1 | * | 4/2016 | ............... H02P 6/16 |
| JP | 04219442 A | * | 8/1992 | |
| JP | 5585058 B2 | * | 9/2014 | |
| JP | 5585058 B2 | | 9/2014 | |
| WO | WO 2006/120547 A1 | | 11/2006 | |
| WO | WO-2006120547 A1 | * | 11/2006 | ............. G01D 5/204 |

OTHER PUBLICATIONS

Kudo, Jun. "Mathematical model errors and their compensations of IPM motor control system," Institute of Electrical Engineers of Japan, SPC-08-25, pp. 25-30, 2008.
Extended European Search Report dated Jun. 18, 2018 in European Patent Application No. 18155728.1, 11 pages.
Feng et al., "Extrapolation Technique for Improving the Effective Resolution of Position Encoders in Permanent-Magnet Motor Drives", IEEE/ASME Transactions on Mechatronics. Aug. 2008; 13(4): 410-415.

\* cited by examiner

MOTOR CONTROLLER, IMAGE FORMING APPARATUS AND MOTOR CONTROLLING METHOD

The entire disclosure of Japanese Patent Application No. 2017-025086 filed on Feb. 14, 2017 is incorporated herein by reference in its entirety.

BACKGROUND

Technological Field

The present disclosure relates to a motor controller for controlling a motor including a rotor formed using a permanent magnet, an image forming apparatus fabricated using the motor controller, and a motor controlling method.

Description of the Related Art

In general, a brushless DC motor includes a stator having a coil and a rotor formed using a permanent magnet, and causes an alternating current to flow through the coil for generating a rotating magnetic field. Thereby, the rotor rotates in synchronization with the rotating magnetic field.

In vector control for the brushless DC motor, an angle, a current value and the like of the rotor with respect to the reference axis are obtained in each control cycle. Then, a pulse width modulation (PWM) signal generated based on these pieces of information is output to the brushless DC motor. Specifically, the PWM signal is generated based on an angle θ(n) of the rotor, a value of the current flowing through the coil and the like that are measured at a time point n. Then, the generated PWM signal is output in the control cycle that starts from a time point n+1 (the time point at which a time length T of the control cycle has elapsed from time point n).

In order to control the brushless DC motor with high efficiency, it is preferable that the PWM signal output in the control cycle from time point n+1 is generated based not on an angle θ(n) of the rotor at time point n but on an angle θ in the control cycle from time point n+1. In this respect, "Mathematical Model Errors and Their Compensations of IPM Motor Control System" by Jun Kudo, Toshihiko Noguchi, Manabu Kawakami, and Koichi Sano (the Institute of Electrical Engineers of Japan, paper materials, SPC-08-25, pp. 25 to 30 (2008)) discloses a technique for generating a PWM signal based on the value obtained by adding, to θ(n), a compensation angle Δθ (=1.5T×ω) that is obtained by multiplying a value that is 1.5 times as large as a time length T of the control cycle by an angular velocity ω.

SUMMARY

In the technique disclosed in "Mathematical Model Errors and Their Compensations of IPM Motor Control System" by Jun Kudo, Toshihiko Noguchi, Manabu Kawakami, and Koichi Sano (the Institute of Electrical Engineers of Japan, paper materials, SPC-08-25, pp. 25 to 30 (2008)), however, compensation angle Δθ is calculated on the precondition that the angular velocity is constant. Accordingly, the compensation angle calculated during acceleration or deceleration is not appropriate, so that the start-up time required for accelerating the rotation speed of the motor from 0 to a prescribed value and the stopping time required for decelerating the rotation speed of the motor from the prescribed value to 0 are increased.

The present disclosure has been made in order to solve the above-described problems. An object in an aspect is to provide a motor controller, an image forming apparatus and a motor controlling method, by which the start-up time and the stopping time for the motor can be shortened.

To achieve at least one of the above-mentioned objects, according to an aspect of the present invention, a motor controller reflecting one aspect of the present invention is configured to control a motor according to a control cycle, the motor including: a coil that generates a rotating magnetic field; and a rotor that is formed using a permanent magnet and rotates by the rotating magnetic field generated by the coil. The motor controller includes: a processor; and a voltage controller. The processor obtains a magnetic pole position and an angular velocity of the rotor at a first time point. The processor calculates a compensation angle by which the rotor advances from the first time point to a second control cycle subsequent to a first control cycle including the first time point, based on an angular acceleration of the rotor, the angular velocity of the rotor at the first time point and a time length of the control cycle. The voltage controller controls a voltage to be applied to the coil such that a rotating magnetic field based on a rotation position of the rotor advanced by the compensation angle from a rotation position of the rotor at the first time point is formed in the second control cycle.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
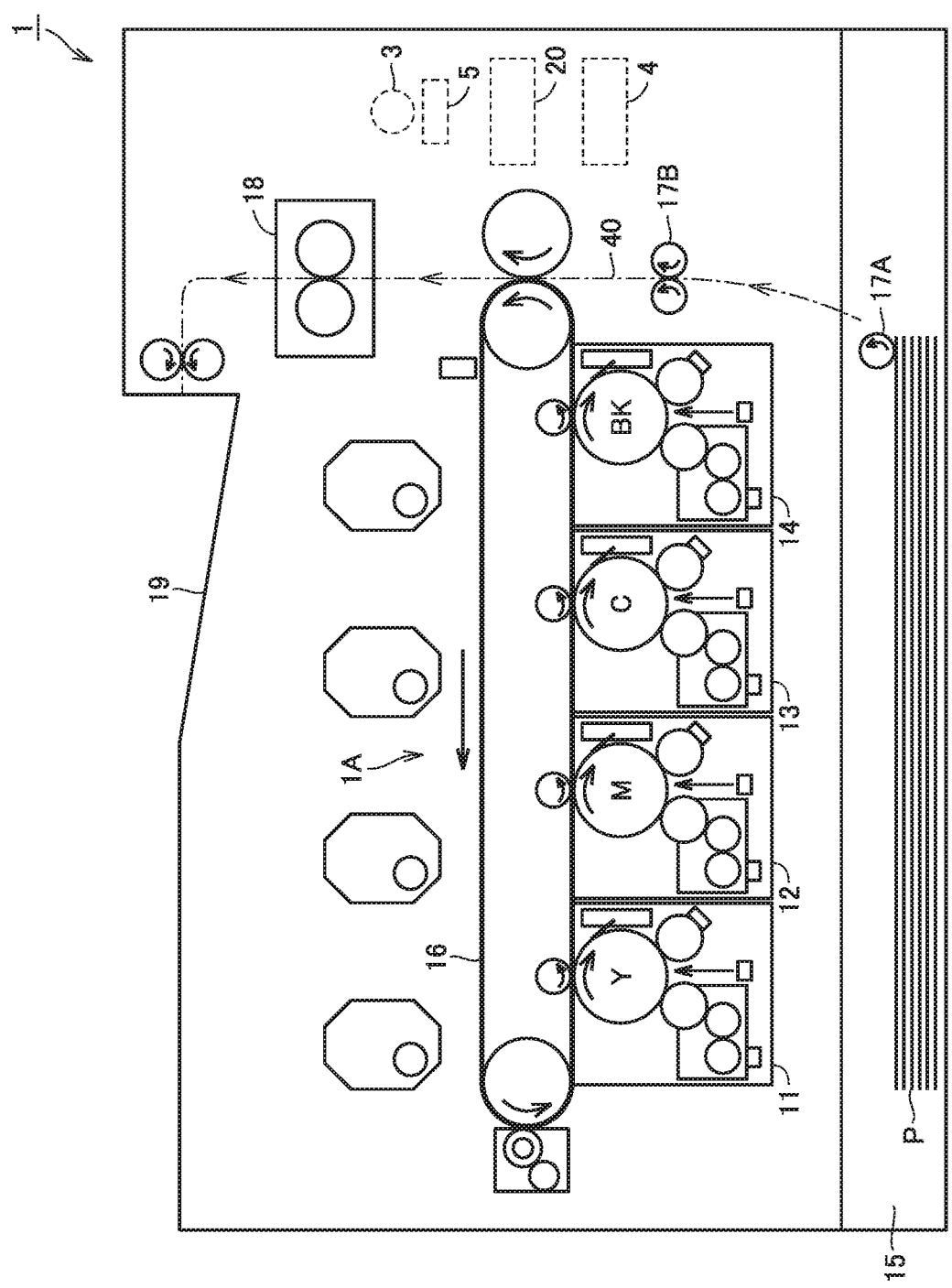
FIG. 1 is a cross-sectional view showing the configuration of an image forming apparatus including a motor controller according to the first embodiment.

Hereinafter, one or more embodiments of the present invention will be described with reference to the drawings. However, the scope of the invention is not limited to the disclosed embodiments.

In the following, a motor controller according to each embodiment of the present invention will be described with reference to the accompanying drawings. In the following description, the same parts and components are designated by the same reference characters. Names and functions thereof are also the same, and accordingly, the detailed description thereof will not be repeated. Each embodiment and each modification in the following description may be selectively combined as appropriate.

In the following, a motor controller applied to an image forming apparatus will be described as an example of the motor controller. It is to be noted that the motor controller may be applied to each of various devices other than the image forming apparatus.

First Embodiment (Internal Configuration of Image Forming Apparatus)

FIG. 1 is a cross-sectional view showing the configuration of an image forming apparatus 1 including a motor controller 20 according to the first embodiment.

As shown in FIG. 1, image forming apparatus 1 serves as a color printer including an electrophotographic-type printer engine 1A. Printer engine 1A has four imaging stations 11, 12, 13, and 14 for forming toner images concurrently in four colors including yellow (Y), magenta (M), cyan (C), and black (K). Each of imaging stations 11, 12, 13, and 14 includes a cylindrical photoreceptor, an electrostatic charger, a developing unit, a cleaner, an exposure light source, and the like.

The toner images in four colors are primarily transferred onto an intermediate transfer belt 16, and secondarily transferred onto a sheet of paper P pulled out from a paper cassette 15 by a paper feeding roller 17A and conveyed through a resist roller 17B. After secondary transfer, sheet of paper P is fed through the inside of a fixing unit 18 to a paper discharge tray 19 provided thereabove. When sheet of paper P passes through fixing unit 18, the toner images are fixed on sheet of paper P by heating and pressurization.

Image forming apparatus 1 includes a plurality of brushless DC motors including a brushless DC motor 3 as driving sources for rotating the rotating bodies such as intermediate transfer belt 16, paper feeding roller 17A, resist roller 17B, fixing unit 18, photoreceptors, rollers of the developing units. Namely, printer engine 1A is configured to convey sheet of paper P or form an image on sheet of paper P by using the rotating bodies rotary-driven by these brushless DC motors.

A sensor 5 is attached to brushless DC motor 3. Sensor 5 is formed of a Hall element or the like, and configured to detect an angle θ (which will be described later) showing the rotation position of the rotor of brushless DC motor 3.

Image forming apparatus 1 further includes a motor controller 20 for controlling brushless DC motor 3 and a host control unit 4.

(Brushless DC Motor)

Figure 2A:
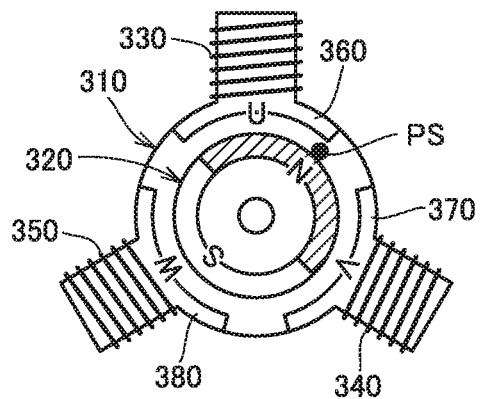
FIG. 2A is a diagram showing an example of the configuration of a brushless DC motor.
Figure 2B:
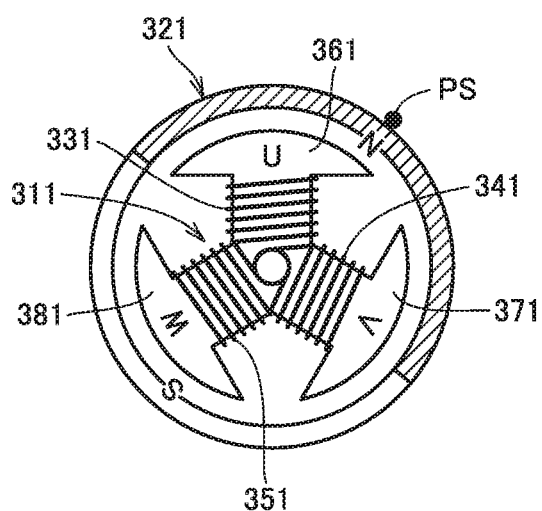
FIG. 2B is a diagram showing another example of the configuration of the brushless DC motor.

FIG. 2A is a diagram showing an example of the configuration of brushless DC motor 3. FIG. 2B is a diagram showing another example of the configuration of brushless DC motor 3.

Brushless DC motor 3 shown as an example in FIG. 2A includes a stator 310 as an armature for generating a rotating magnetic field, and an inner-type rotor 320 formed using a permanent magnet. Stator 310 includes a U-phase core 360, a V-phase core 370 and a W-phase core 380 that are arranged at 120° with respect to each other, and three Y-connection coils 330, 340 and 350 that are arranged at 120° with respect to each other. Alternating currents of three phases including a U-phase, a V-phase and a W-phase are caused to flow through coils 330, 340 and 350, respectively, so as to sequentially energize cores 360, 370 and 380, thereby generating a rotating magnetic field. Rotor 320 rotates in synchronization with this rotating magnetic field.

Brushless DC motor 3 shown as an example in FIG. 2B includes a stator 311 as an armature for generating a rotating magnetic field, and an outer-type rotor 321 formed using a permanent magnet. Stator 311 includes a U-phase core 361, a V-phase core 371 and a W-phase core 381 that are arranged at 120° with respect to each other, and three Y-connection coils 331, 341 and 351 that are arranged at 120° with respect to each other. Alternating currents of three phases including a U-phase, a V-phase and a W-phase are caused to flow through coils 331, 341 and 351, respectively, so as to sequentially energize cores 361, 371 and 381, thereby generating a rotating magnetic field. Rotor 321 rotates in synchronization with this rotating magnetic field.

In the examples shown in FIGS. 2A and 2B, the number of magnetic poles of each of rotors 320 and 321 is two. However, the number of magnetic poles of each of rotors 320 and 321 is not limited to two, but may be four, or may be six or more. Also, the slot number of each of stators 310 and 311 is not limited to three.

In the following description, brushless DC motor 3 is assumed to have a configuration shown in FIG. 2A. The rotation angle position at the N pole shown by a black dot in rotor 320 is referred to as a "magnetic pole position PS" of rotor 320. "Magnetic pole position PS" shows the rotation position of rotor 320. Also, the direction from the rotation center of rotor 320 toward magnetic pole position PS thereof is referred to as a "magnetic pole direction".

(Outline of Motor Controller)

In the following, the outline of motor controller 20 will be described. Motor controller 20 performs vector control using the control model based on a d-q axis coordinate system. The d-axis corresponds to the magnetic pole direction of rotor 320 (the direction of the N pole) while the q-axis corresponds to the direction advanced by an electrical angle of $\pi/2$[rad] (90°) from the d-axis. Also, assuming that the axis of U-phase coil 330 is defined as a reference, the advance angle of the d-axis with respect to this reference axis is defined as θ. This angle θ shows the angular position of the magnetic pole (magnetic pole position PS) of rotor 320 with respect to U-phase coil 330. The d-q axis coordinate system is located at the position advanced by angle θ from U-phase coil 330 as a reference.

Angle θ is detected by sensor 5. Motor controller 20 receives angle θ that is a detection result from sensor 5.

Figure 3:
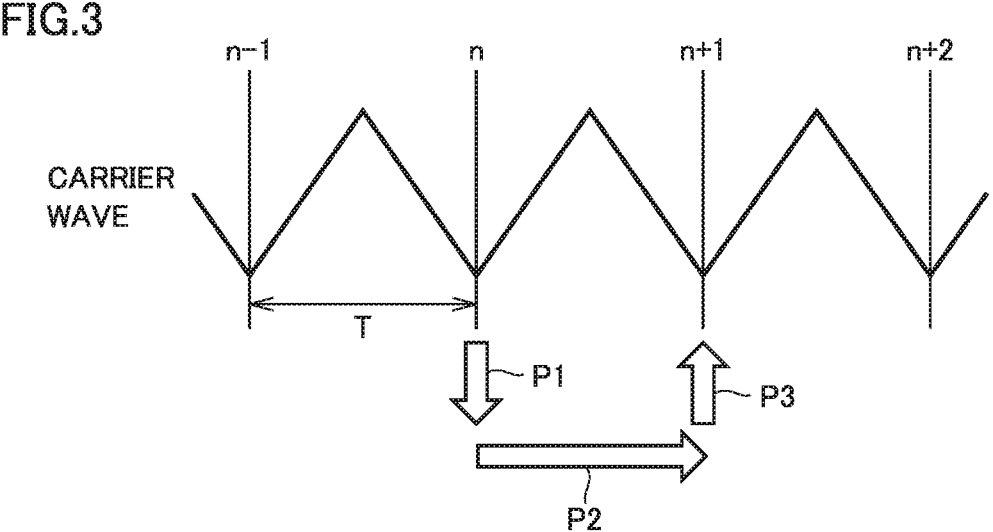
FIG. 3 is a diagram showing an outline of a method of controlling the brushless DC motor by the motor controller.

FIG. 3 is a diagram showing an outline of a method of controlling brushless DC motor 3 by motor controller 20. On the condition that the cycle of a carrier wave (PWM cycle) is defined as a control cycle (a time length T), motor controller 20 generates a PWM signal in each control cycle, and controls brushless DC motor 3 according to the generated PWM signal.

In the following description, the control cycle starting from a time point n is defined as the n-th control cycle; the control cycle starting from a time point n+1 (the time point at which a time length T of the control cycle has elapsed since time point n) is defined as the (n+1)th control cycle; and the control cycle starting from a time point n−1 (the time point before time point n, in which the time period between time point n−1 and time point n corresponds to time length T of the control cycle) is defined as the (n−1)th control cycle. Furthermore, the time point at which time length T of the control cycle has elapsed since time point n+1 is defined as a time point n+2.

Motor controller 20 performs a process P1 for obtaining, at time point n, an angle θ(n) showing magnetic pole position PS of rotor 320, and a value of the current flowing through stator 310 of brushless DC motor 3.

Motor controller 20 performs a process P2 for calculating a PWM modulation ratio (a duty ratio) in the (n+1)th control cycle based on angle θ(n) and the value of the current flowing through stator 310, which are measured at time point n. Motor controller 20 performs process P2 during a time period from time point n to time point n+1 (that is, the n-th control cycle).

At the start time point (time point n+1) in the (n+1)th control cycle, motor controller 20 performs a process P3 for applying a voltage having a waveform according to the PWM modulation ratio obtained by process P2 to each of U-phase coil 330, V-phase coil 340 and W-phase coil 350 of brushless DC motor 3.

(Configuration of Motor Controller According to Reference Example)

Figure 4:
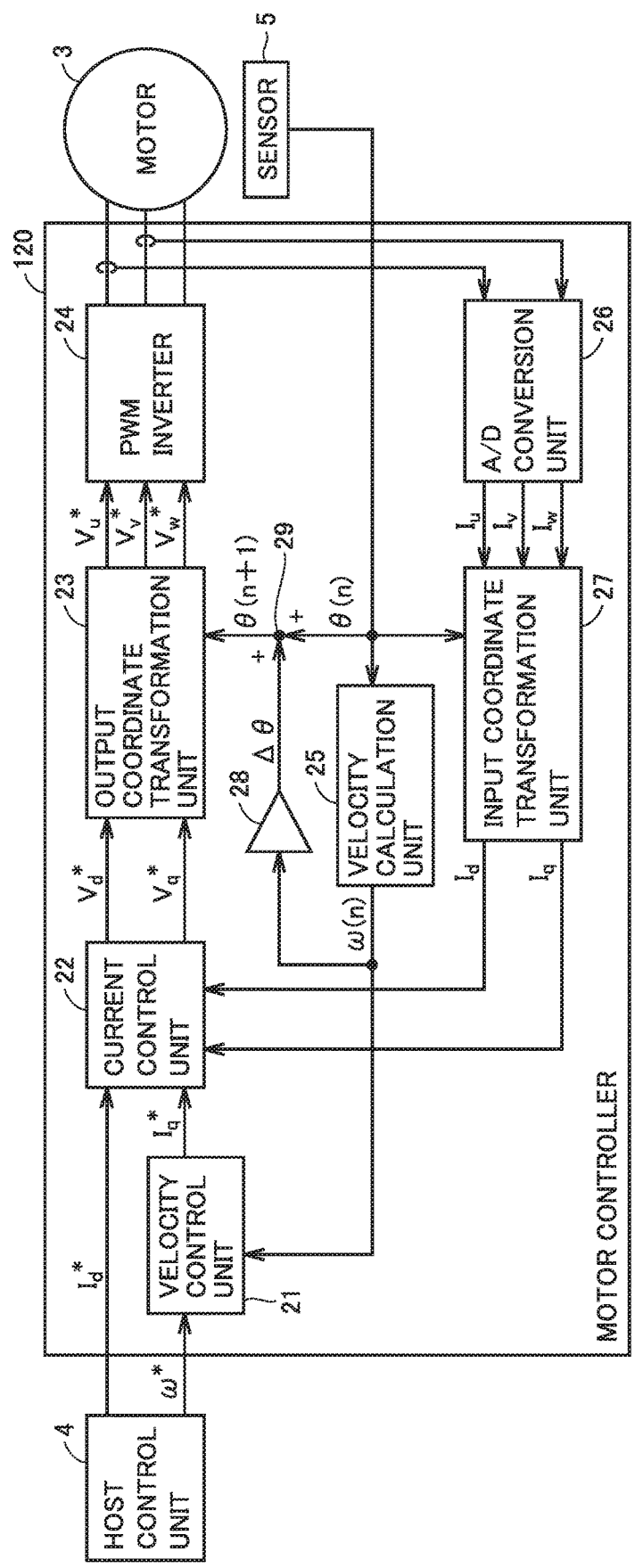
FIG. 4 is a block diagram showing the schematic configuration of a motor controller according to a reference example.

Before describing motor controller 20 according to the first embodiment, a motor controller 120 as a reference example of the present invention will be hereinafter described with reference to FIG. 4. FIG. 4 is a block diagram showing the schematic configuration of motor controller 120.

As shown in FIG. 4, motor controller 120 receives a target angular velocity ω* and a d-axis current command value Id* from host control unit 4. Furthermore, motor controller 120 receives an angle θ(n) of rotor 320 at time point n, which is detected by sensor 5.

Motor controller 120 includes a velocity control unit 21, a current control unit 22, an output coordinate transformation unit 23, a PWM inverter 24, a velocity calculation unit 25, an analog-to-digital (A/D) conversion unit 26, an input coordinate transformation unit 27, a multiplier 28, and an adder 29.

Velocity control unit 21 determines a q-axis current command value Iq* by proportional integral (PI) operation such that the deviation between target angular velocity ω* received from host control unit 4 and angular velocity ω(n) of rotor 320 at time point n received from velocity calculation unit 25 converges to zero.

Current control unit 22 receives a d-axis current value Id and a q-axis current value Iq at time point n from input coordinate transformation unit 27. Current control unit 22 determines a d-axis voltage command value Vd* by PI operation such that the deviation between d-axis current value Id and d-axis current command value Id* that is received from host control unit 4 converges to zero. Current control unit 22 determines a q-axis voltage command value Vq* by PI operation such that the deviation between q-axis current value Iq and q-axis current command value Iq* that is determined by velocity control unit 21 converges to zero.

Output coordinate transformation unit 23 performs coordinate transformation using an estimated angle θ(n+1) output from adder 29, thereby converting d-axis voltage command value Vd* and q-axis voltage command value Vq* that are determined by current control unit 22 into a U-phase voltage command value Vu*, a V-phase voltage command value Vv* and a W-phase voltage command value Vw*. In other words, output coordinate transformation unit 23 generates U-phase voltage command value Vu*, V-phase voltage command value Vv* and W-phase voltage command value Vw* such that a rotating magnetic field based on magnetic pole position PS of rotor 320 shown by estimated angle θ(n+1) is generated by stator 310.

PWM inverter 24 determines the duty ratio of the PWM control signal by comparing U-phase voltage command value Vu*, V-phase voltage command value Vv* and W-phase voltage command value Vw* with the voltage of the carrier wave (see FIG. 3). PWM inverter 24 generates a U-phase voltage Vu, a V-phase voltage Vv and a W-phase voltage Vw each having a waveform according to the determined duty ratio, and outputs the generated voltages to stator 310 of brushless DC motor 3 in the (n+1)th control cycle. In other words, PWM inverter 24 controls the voltage to be applied to stator 310 such that a rotating magnetic field based on magnetic pole position PS of rotor 320 shown by estimated angle θ(n+1) is generated by stator 310.

A/D conversion unit 26 performs A/D conversion of the values of the U-phase current and the V-phase current flowing from brushless DC motor 3, and outputs a U-phase current value Iu and a V-phase current value Iv. Since the sum of U-phase current value Iu, V-phase current value Iv and W-phase current value Iw is 0, A/D conversion unit 26 calculates W-phase current value Iw based on U-phase current value Iu and V-phase current value Iv, and then also outputs W-phase current value Iw.

Input coordinate transformation unit 27 performs coordinate transformation using an angle θ(n) obtained from sensor 5, thereby converting U-phase current value Iu, V-phase current value Iv and W-phase current value Iw that are output from A/D conversion unit 26 into d-axis current value Id and q-axis current value Iq.

Velocity calculation unit 25 calculates an angular velocity ω(n) based on the change in angle θ(n) obtained from sensor 5.

Multiplier 28 multiplies angular velocity ω(n) calculated by velocity calculation unit 25 by time length T of the control cycle and coefficient 1.5, and then, outputs the resultant 1.5T×ω(n) as a compensation angle Δθ.

Adder 29 adds compensation angle Δθ to angle θ(n) obtained from sensor 5, and outputs an addition result (θ(n)+Δθ) as estimated angle θ(n+1).

(As to Compensation Angle in Reference Example)

Figure 5:
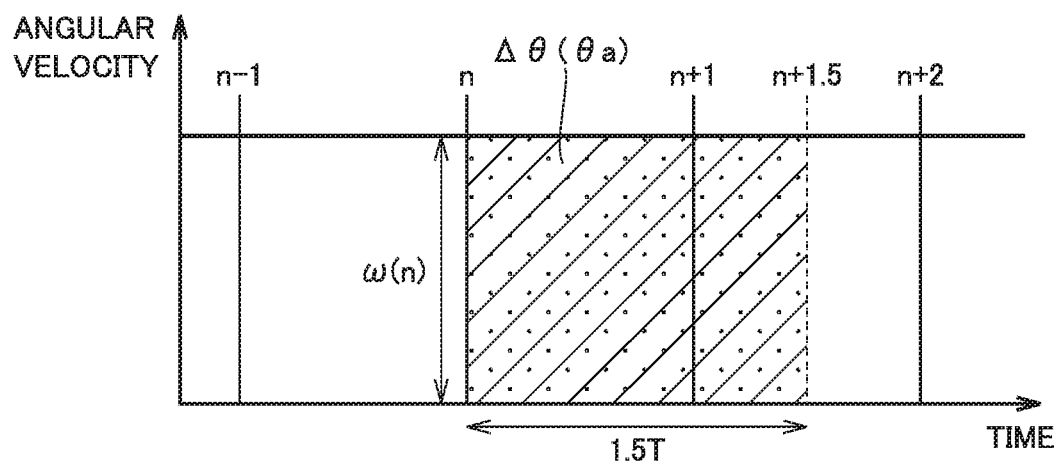
FIG. 5 is a diagram showing the relation between: an advance angle of the rotor at a constant angular velocity in a time period from a time point n until a time period that is 1.5 times as long as a time length T of the control cycle has elapsed; and a compensation angle in a reference example.

Referring to FIG. 5, the details of compensation angle Δθ calculated by multiplier 28 will be hereinafter described. FIG. 5 is a diagram showing the relation between: an advance angle θa of rotor 320 at a constant angular velocity in a time period from time point n until a time period that is 1.5 times as long as a time length T of the control cycle has elapsed; and compensation angle Δθ calculated by multiplier 28.

The waveform of the voltage output to brushless DC motor 3 in the (n+1)th control cycle is symmetrical to the time point in the middle of the (n+1)th control cycle (the time point at which T/2 has elapsed since time point n+1: which will be hereinafter referred to as a time point n+1.5). Accordingly, the average value of the delay time periods, from time point n, of the waveform of the voltage output in the (n+1)th control cycle is to be 1.5 times (1.5 T) as long as time length T of the control cycle. In motor controller 120 according to the reference example, compensation angle Δθ is calculated based on the value that is 1.5 times as long as time length T of the control cycle.

Specifically, assuming that angular velocity ω(n) of rotor 320 at time point n continues until the time period that is 1.5 times as long as time length T of the control cycle elapses, 1.5T×ω(n) corresponding to the area of the diagonally shaded region shown in FIG. 5 is calculated as compensation angle Δθ.

As shown in FIG. 5, compensation angle Δθ coincides with advance angle θa (dot pattern region in the figure) of rotor 320 at a constant angular velocity in a time period from time point n until the time period that is 1.5 times as long as time length T of the control cycle has elapsed. Accordingly, when the angular velocity of rotor 320 is constant, motor controller 120 can perform vector control using compensation angle Δθ adapted to the actual movement of rotor 320.

(Problems of Motor Controller in Reference Example)

Figure 6:
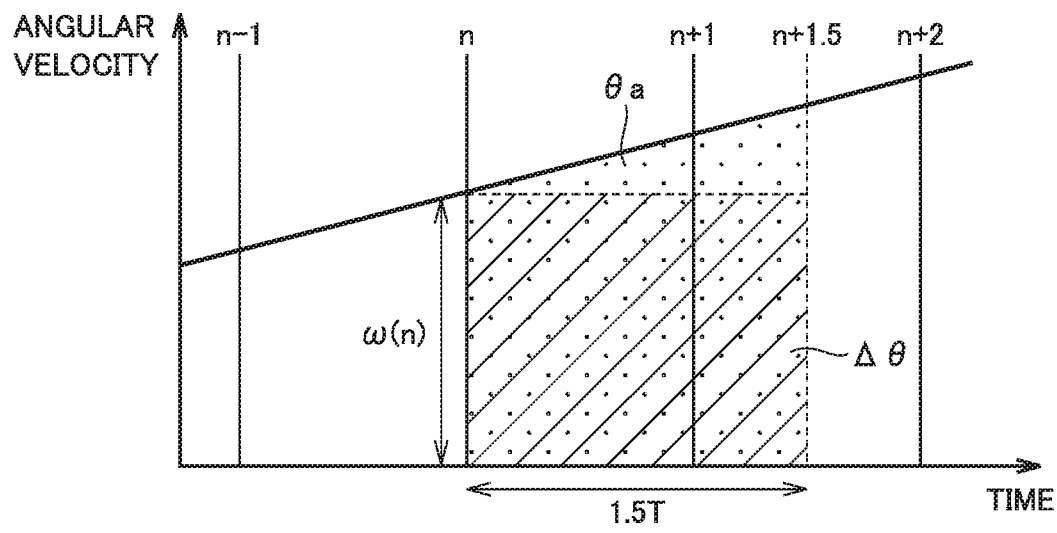
FIG. 6 is a diagram showing the relation between: the advance angle of the rotor during acceleration in a time period from time point n until the time period that is 1.5 times as long as time length T of the control cycle has elapsed; and a compensation angle Δθ in the reference example.

Referring to FIG. 6, the problems of motor controller 120 in the reference example will be hereinafter described. FIG. 6 is a diagram showing the relation between advance angle θa of rotor 320 during acceleration in a time period from time point n until the time period that is 1.5 times as long as time length T of the control cycle has elapsed (dot pattern region); and compensation angle Δθ calculated by multiplier 28 (diagonally shaded region).

As shown in FIG. 6, during acceleration, compensation angle Δθ output from multiplier 28 (diagonally shaded region) is greatly different from advance angle θa of rotor 320 in a time period from time point n until the time period that is 1.5 times as long as time length T of the control cycle has elapsed (dot pattern region). Accordingly, when vector control using compensation angle Δθ is performed, the time period required for startup of brushless DC motor 3 becomes relatively long. The time period required for startup herein means the time period required for causing rotor 320 in the non-rotating state to rotate at a target velocity.

Similarly, also during deceleration, compensation angle Δθ output from multiplier 28 is greatly different from advance angle θa of rotor 320 in a time period from time point n until the time period that is 1.5 times as long as time length T of the control cycle has elapsed. Accordingly, when vector control using the compensation angle Δθ is performed, the time period required for stopping brushless DC motor 3 becomes relatively long. The time period required for stopping herein means the time period required for causing rotor 320 rotating at the target velocity to be brought into a non-rotating state.

In this way, in motor controller 120 according to the reference example, there is a large difference between compensation angle Δθ and actual advance angle θa of rotor 320, which causes a problem that it takes relatively long to start or stop brushless DC motor 3.

(Configuration of Motor Controller According to First Embodiment)

Figure 7:
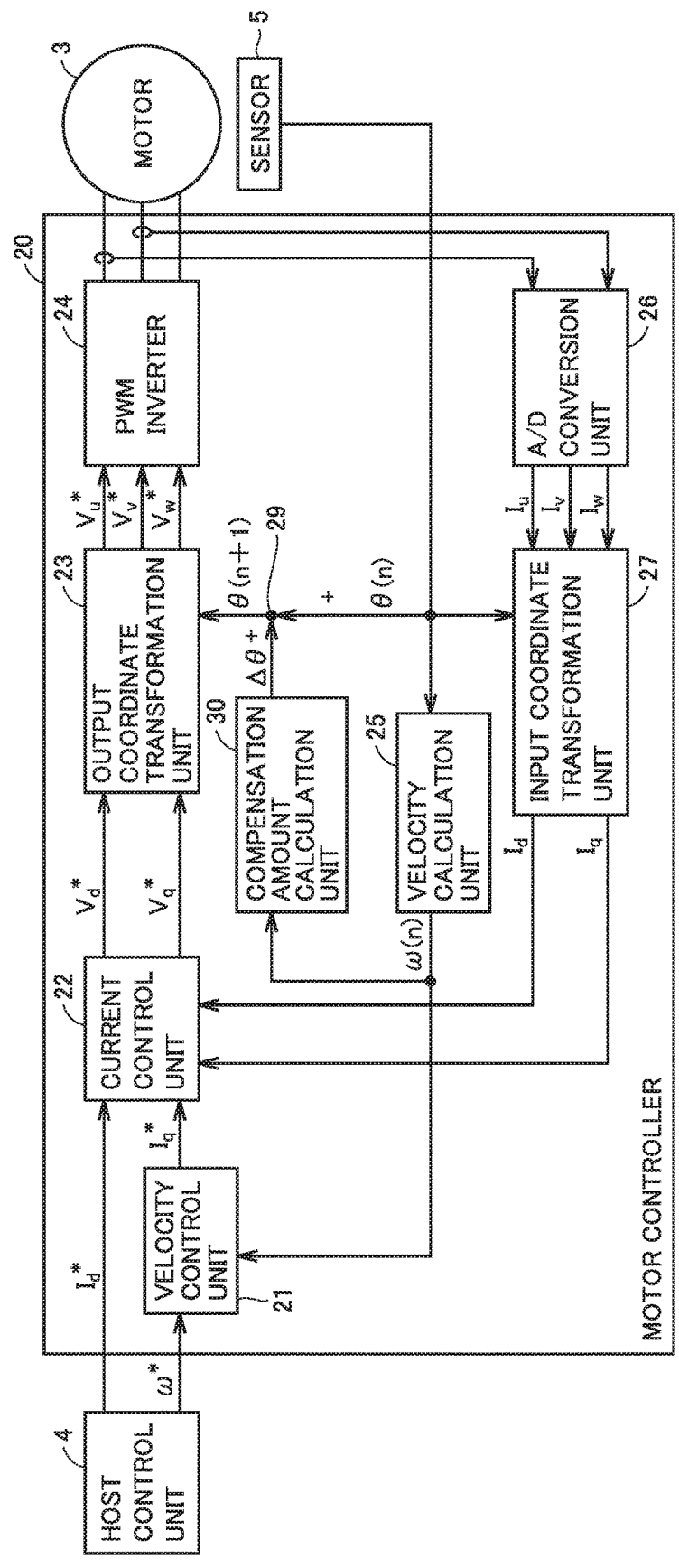
FIG. 7 is a block diagram showing the schematic configuration of a motor controller according to the first embodiment.

Motor controller 20 according to the first embodiment solves the above-described problem. Referring to FIG. 7, the configuration of a motor controller 20 will be hereinafter described. FIG. 7 is a block diagram showing the schematic configuration of motor controller 20 according to the first embodiment.

As shown in FIG. 7, motor controller 20 is different from motor controller 120 shown in FIG. 4 in that this motor controller 20 includes a compensation amount calculation unit 30 in place of multiplier 28. Since other features of motor controller 20 are the same as those of motor controller 120 shown in FIG. 4, the description thereof will not be hereinafter repeated. In addition, velocity control unit 21, current control unit 22, output coordinate transformation unit 23, velocity calculation unit 25, A/D conversion unit 26, input coordinate transformation unit 27, and compensation amount calculation unit 30 are, for example, formed of a microcomputer, and implemented by a hardware processor (microprocessor) included in the microcomputer executing a program stored in its storage device. PWM inverter 24 is formed of an inverter circuit including a switching element.

Based on angular velocity ω(n), time length T of the control cycle and angular acceleration a(n) of rotor 320, compensation amount calculation unit 30 calculates compensation angle Δθ by which rotor 320 advances from time point n until the (n+1)th control cycle (the control cycle starting from time point n+1).

Specifically, compensation amount calculation unit 30 calculates angular acceleration a(n) by dividing the difference between angular velocity ω(n−1) of rotor 320 at time point n−1 and angular velocity ω(n) of rotor 320 at time point n by time length T of the control cycle.

Compensation amount calculation unit 30 stores the information showing the correlation between the value of the angular acceleration and a coefficient k in advance. By referring to this information, compensation amount calculation unit 30 obtains coefficient k corresponding to the calculated angular acceleration a(n). Compensation amount calculation unit 30 calculates compensation angle Δθ according to the following equation (1).

$$\Delta\theta = k \times T \times \omega(n) \qquad \text{Equation (1)}$$

In this case, the information showing the correlation between the value of the angular acceleration and coefficient k shows the correlation that coefficient k becomes larger as the angular acceleration is larger. Specifically, coefficient k is set to be greater than 1.5 when angular acceleration a(n) is positive, set to be smaller than 1.5 when angular acceleration a(n) is negative, and set to be 1.5 when angular acceleration a(n) is 0. For example, coefficient k is set to be 2 when angular acceleration a(n) is positive, and set to be 1 when angular acceleration a(n) is negative. Alternatively, coefficient k is set such that a value A calculated by the following equation (2) is equal to or less than a prescribed value (preferably 0).

$$A=1.5T\times1.5T\times a(n)/2-(k\times T-1.5T)\times\omega(n) \qquad \text{Equation (2)}$$

The information showing the correlation between the value of the angular acceleration and coefficient k may be, for example, a correlation equation between the value of the angular acceleration and coefficient k, or may be a table in which the value of the angular acceleration and coefficient k are associated with each other.

Figure 8:
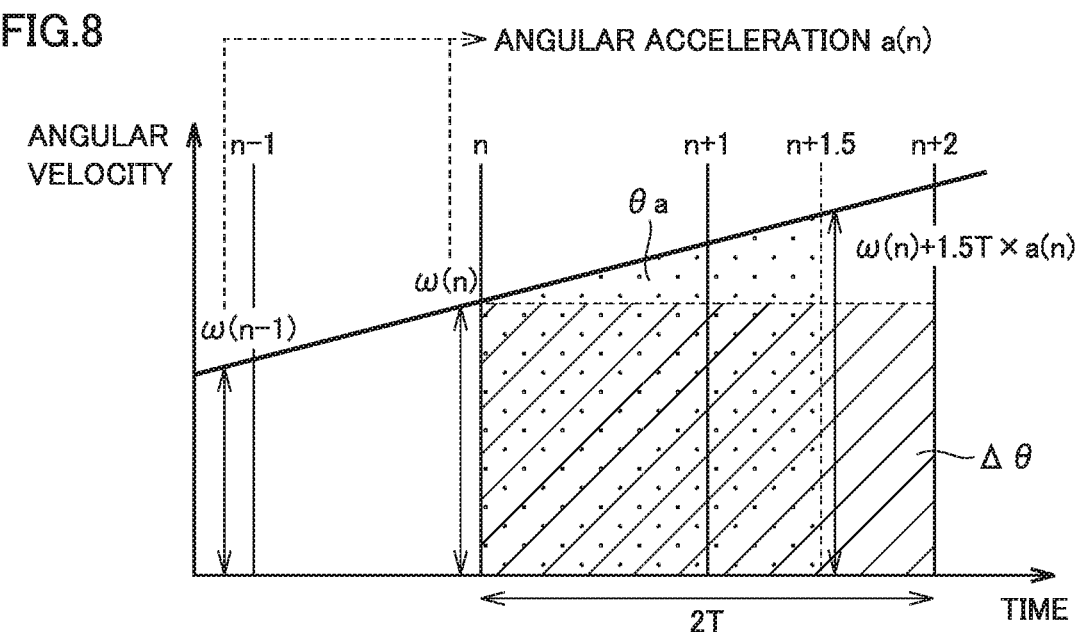
FIG. 8 is a diagram showing the relation between: the advance angle of the rotor during acceleration in a time period that is 1.5 times as long as time length T of the control cycle; and compensation angle Δθ in the first embodiment.

FIG. 8 is a diagram showing the relation between: advance angle θa of rotor 320 during acceleration in a time period that is 1.5 times as long as time length T of the control cycle; and compensation angle Δθ calculated by compensation amount calculation unit 30. FIG. 8 also shows compensation angle Δθ obtained when coefficient k=2.

In the example shown in FIG. 8, compensation amount calculation unit 30 calculates 2 T×ω(n) as compensation angle Δθ. Compensation angle Δθ shows a rectangular area (the region with diagonal patterns) in which (time point, angular velocity)=(n, 0), (n+2, 0), (n, ω(n)), and (n+2, ω(n)) that are included as four vertices.

On the other hand, advance angle θa of rotor 320 in a time period that is 1.5 times as long as time length T of the control cycle shows a trapezoidal area (a region with dot patterns) in which (time point, angular velocity)=(n, 0), (n+1.5, 0), (n, ω(n)), and (n+1.5, ω(n)+1.5T×a(n)) that are included as four vertices.

As shown in FIG. 8, compensation angle Δθ and advance angle θa of rotor 320 in the time period that is 1.5 times as long as time length T of the control cycle are approximately the same. In other words, the difference shown in FIG. 8 between compensation angle Δθ and advance angle θa of rotor 320 in the time period that is 1.5 times as long as time length T of the control cycle is smaller than the difference shown in FIG. 6 between compensation angle Δθ and advance angle θa of rotor 320 in the time period that is 1.5 times as long as time length T of the control cycle. Thereby, even during acceleration or deceleration of brushless DC motor 3, motor controller 20 can perform vector control using compensation angle Δθ adapted to the actual movement of rotor 320. Consequently, the time period required for starting or stopping brushless DC motor 3 can be shortened.

(Process Flow in Motor Controller)

Figure 9:
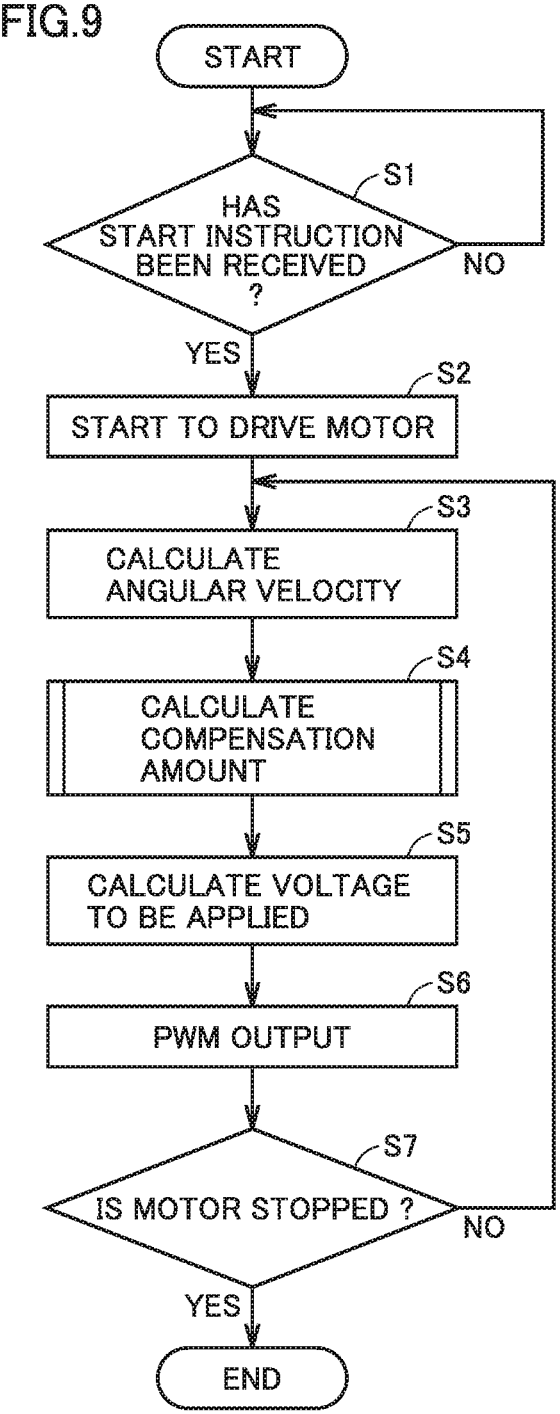
FIG. 9 is a flowchart illustrating the entire flow of a process in the motor controller.
Figure 10:
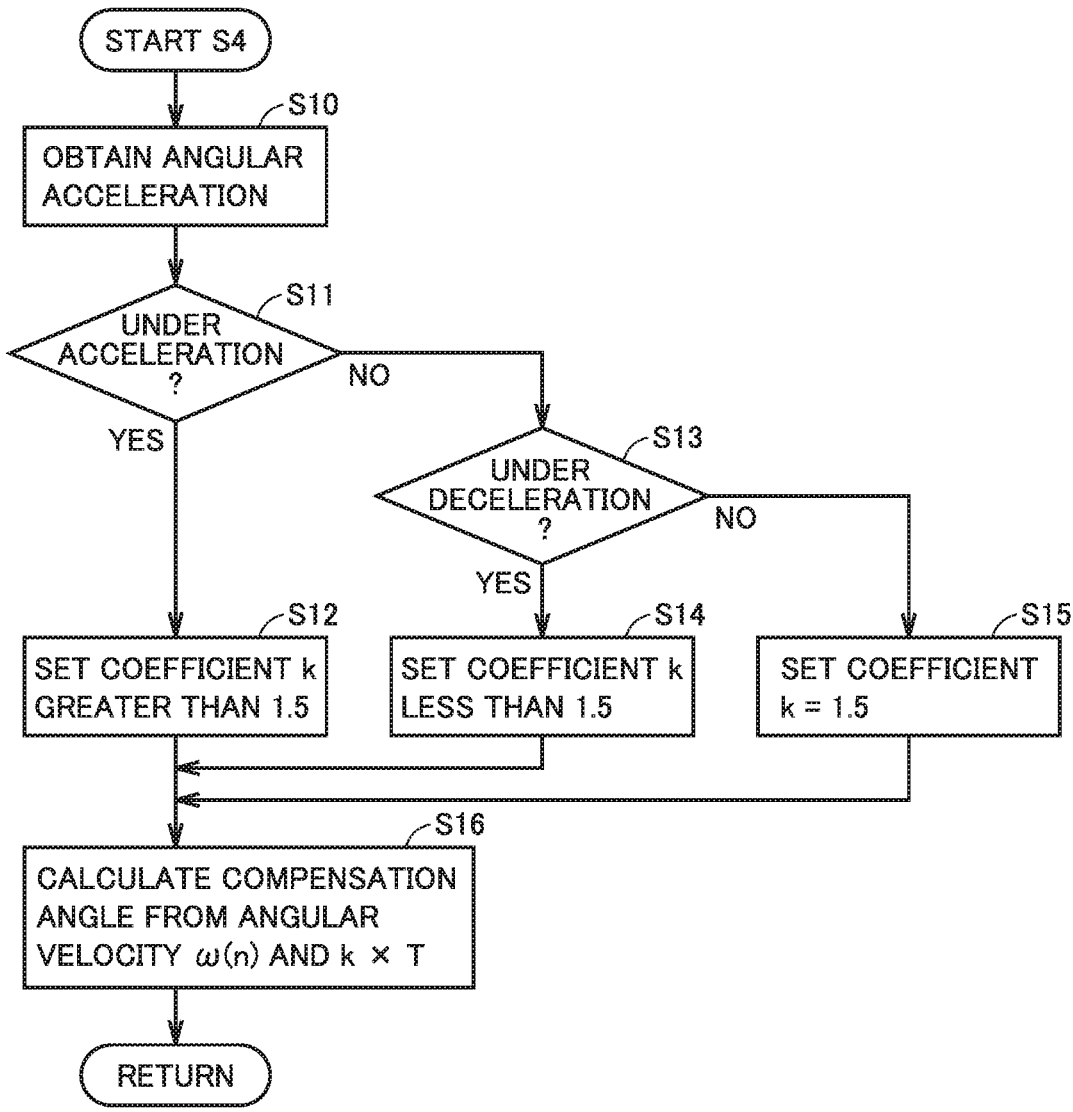
FIG. 10 is a flowchart illustrating the flow of a process of calculating a compensation amount, which is shown in FIG. 9.

Referring to FIGS. 9 and 10, the process flow in motor controller 20 will be hereinafter described. FIG. 9 is a flowchart illustrating the entire flow of a process in motor controller 20. FIG. 10 is a flowchart illustrating the flow of a process of calculating a compensation amount (step S4), which is shown in FIG. 9.

In step S1, motor controller 20 determines whether a start instruction has been received or not. When motor controller 20 has not received the start instruction (NO in S1), motor controller 20 repeats the process in step S1 again.

When motor controller 20 has received the start instruction (YES in S1), then, in step S2, motor controller 20 obtains target angular velocity ω* and d-axis current command value Id* from host control unit 4, and starts to drive brushless DC motor 3.

Then, in step S3, based on the amount of change in angle θ(n) of magnetic pole position PS detected by sensor 5, velocity calculation unit 25 calculates angular velocity ω(n) of rotor 320 at time point n.

Then, in step S4, compensation amount calculation unit 30 performs the compensation amount calculation process for calculating compensation angle Δθ based on angular velocity ω(n), time length T of the control cycle, and angular acceleration a(n) of rotor 320.

Then, in step S5, output coordinate transformation unit 23 calculates a U-phase voltage command value Vu*, a V-phase voltage command value Vv* and a W-phase voltage command value Vw* by using estimated angle θ(n+1) that is an additional value of compensation angle Δθ and angle θ(n).

Then, in step S6, PWM inverter 24 generates a U-phase voltage Vu, a V-phase voltage Vv and a W-phase voltage Vw each having a waveform according to the duty ratio determined based on U-phase voltage command value Vu*, V-phase voltage command value Vv* and W-phase voltage command value Vw*, respectively. PWM inverter 24 outputs the generated voltage to brushless DC motor 3 in the (n+1)th control cycle.

Then, in step S7, motor controller 20 determines whether brushless DC motor 3 is stopped or not (that is, whether the rotation speed of rotor 320 is zero or not). When brushless DC motor 3 is stopped (YES in S7), motor controller 20 ends the process. When brushless DC motor 3 is not stopped (NO in S7), the process is returned to step S3. Steps S3 to S7 are repeated for each control cycle.

Referring to FIG. 10, the process flow of the subroutine in step S4 will be hereinafter described. In step S10, compensation amount calculation unit 30 first calculates (obtains) angular acceleration a(n) from the amount of change between angular velocity ω(n) at time point n and angular velocity ω(n−1) at time point n−1.

Then, in step S11, compensation amount calculation unit 30 determines whether brushless DC motor 3 is under acceleration or not. Specifically, when angular acceleration a(n) is a positive value, compensation amount calculation unit 30 determines that brushless DC motor 3 is under acceleration. When brushless DC motor 3 is under acceleration (YES in S11), compensation amount calculation unit 30 sets coefficient k greater than 1.5 (step S12). In this case, compensation amount calculation unit 30 may set coefficient k to be a fixed value (for example, 2) irrespective of angular acceleration a(n), or may set coefficient k to be larger as angular acceleration a(n) becomes larger.

When brushless DC motor 3 is not under acceleration (NO in S11), compensation amount calculation unit 30 determines whether brushless DC motor 3 is under deceleration or not (step S13). Specifically, when angular acceleration a(n) is a negative value, compensation amount calculation unit 30 determines that brushless DC motor 3 is under deceleration. When brushless DC motor 3 is under deceleration (YES in S13), compensation amount calculation unit 30 sets coefficient k smaller than 1.5 (step S14). In this case, compensation amount calculation unit 30 may set coefficient k of a fixed value (for example, 1) irrespective of angular acceleration a(n), or may set coefficient k to be smaller as angular acceleration a(n) becomes smaller (that is, as the absolute value of angular acceleration a(n) becomes larger).

When brushless DC motor 3 is not under deceleration (NO in S13), compensation amount calculation unit 30 sets coefficient k at 1.5 (step S15).

Then, in step S16, compensation amount calculation unit 30 calculates, as compensation angle Δθ, a value obtained by multiplying angular velocity ω(n) at time point n, time length T of the control cycle and coefficient k. Then, the process is returned to step S5 in FIG. 9.

(Advantages)

As described above, motor controller 20 includes velocity calculation unit 25, compensation amount calculation unit 30, output coordinate transformation unit 23, and PWM inverter 24. Velocity calculation unit 25 functions as an obtaining unit for obtaining: angle θ(n), which shows magnetic pole position PS, and angular velocity ω(n) of rotor 320 at time point n (the first time point). Based on angular acceleration a(n) of rotor 320, angular velocity ω(n) of rotor 320 at time point n and time length T of the control cycle, compensation amount calculation unit 30 calculates compensation angle Δθ by which rotor 320 advances from time point n to the (n+1)th control cycle (the control cycle starting from time point n+1). Output coordinate transformation unit 23 and PWM inverter 24 function as a voltage controller for controlling a voltage to be applied to coils 330, 340 and 350 such that a rotating magnetic field based on the magnetic pole position of rotor 320 advanced by compensation angle Δθ from its magnetic pole position PS at time point n is formed in the (n+1)th control cycle.

According to the above-described configuration, compensation angle Δθ by which rotor 320 advances from time point n to the (n+1)th control cycle is calculated based on angular acceleration a(n) of rotor 320. Thereby, even if brushless DC motor 3 is under acceleration or deceleration, motor controller 20 can perform vector control using compensation angle Δθ according to the actual movement of rotor 320. Consequently, the time period required for starting or stopping brushless DC motor 3 can be shortened.

Compensation amount calculation unit 30 sets coefficient k according to angular acceleration a(n) of rotor 320 to calculate, as compensation angle Δθ, a value obtained by multiplying angular velocity ω(n) of rotor 320 at time point n by time length T of the control cycle and coefficient k. In this case, compensation amount calculation unit 30 sets coefficient k to be larger as angular acceleration a(n) of rotor 320 becomes larger.

Thereby, compensation angle Δθ becomes larger while brushless DC motor 3 is under acceleration, and compensation angle Δθ becomes smaller while brushless DC motor 3 is under deceleration. Consequently, even if brushless DC motor 3 is under acceleration or deceleration, motor controller 20 can simply calculate compensation angle Δθ according to the actual movement of rotor 320. As a result, the time period required for starting or stopping brushless DC motor 3 can be shortened.

Specifically, PWM inverter 24 controls the voltage to be applied to coils 330, 340 and 350 according to the PWM control. The control cycle is a PWM cycle. Time point n corresponds to the start time point of the n-th control cycle. The time point in the middle of the pulse output time period in the (n+1)th control cycle (the second time point) coincides with time point n+1.5 in the middle of the (n+1)th control cycle. Compensation amount calculation unit 30 sets coefficient k greater than 1.5 when angular acceleration a(n) of rotor 320 is positive, and sets coefficient k smaller than 1.5 when angular acceleration a(n) is negative.

Thereby, when brushless DC motor 3 is under acceleration, it becomes possible to readily calculate compensation angle Δθ greater than the advance angle of rotor 320 obtained when the angular acceleration of brushless DC motor 3 is 0. Similarly, when brushless DC motor 3 is under deceleration, it becomes possible to readily calculate compensation angle Δθ smaller than the advance angle of rotor 320 obtained when the angular acceleration of brushless DC motor 3 is 0. As a result, the time period required for starting or stopping brushless DC motor 3 can be shortened.

Furthermore, velocity calculation unit 25 further calculates angular velocity ω(n−1) of rotor 320 at time point n−1 (the third time point) before time point n, in which the time period between time point n−1 and time point n corresponds to time length T of the control cycle. Compensation amount calculation unit 30 calculates angular acceleration a(n) of rotor 320 based on angular velocity ω(n−1) and angular velocity ω(n). Thereby, angular acceleration a(n) of rotor 320 is also readily calculated.

(Modification)

The method of calculating angular acceleration a(n) in compensation amount calculation unit 30 is not limited to the above-described method. For example, compensation amount calculation unit 30 may receive a velocity command value (target angular velocity) ω* from host control unit 4, and calculate angular acceleration a(n) of rotor 320 based on velocity command value ω* and angular velocity ω(n). Specifically, compensation amount calculation unit 30 defines, as angular acceleration a(n), the value obtained by dividing the difference between velocity command value ω* and angular velocity ω(n) by time length T of the control cycle. Thereby, angular acceleration a(n) of rotor 320 is also readily calculated.

In the above description, it is assumed that velocity calculation unit 25 calculates angular velocity ω(n) of roller 320 at time point n. However, when sensor 5 can detect the angular velocity of rotor 320, velocity calculation unit 25 may obtain angular velocity ω(n) and angle θ(n) from sensor 5.

Second Embodiment

The motor controller according to the second embodiment is a modification of motor controller 20 in the first embodiment. The motor controller in the second embodiment is different from motor controller 20 in the first embodiment only in the method of calculating compensation angle Δθ in compensation amount calculation unit 30.

Compensation amount calculation unit 30 calculates angular acceleration a(n) in the same manner as in the first embodiment. In the time period from time point n to the time point in the middle of the pulse output time period in the (n+1)th control cycle (the time length of this time period is defined as Ta), compensation amount calculation unit 30 calculates, as compensation angle Δθ, the angle by which rotor 320 advances according to angular acceleration a(n). Specifically, compensation amount calculation unit 30 calculates compensation angle Δθ according to the following equation (3).

$$\Delta\theta = \omega(n) \times Ta + a(n) \times Ta^2/2 \qquad \text{Equation (3)}$$

When the time point in the middle of the pulse output time period in the (n+1)th control cycle coincides with time point n+1.5 in the middle of the (n+1)th control cycle, compensation amount calculation unit 30 calculates compensation angle Δθ according to the following equation (4).

$$\Delta\theta = \omega(n) \times 1.5T + a(n) \times (1.5T)^2/2 \qquad \text{Equation (4)}$$

Figure 11:
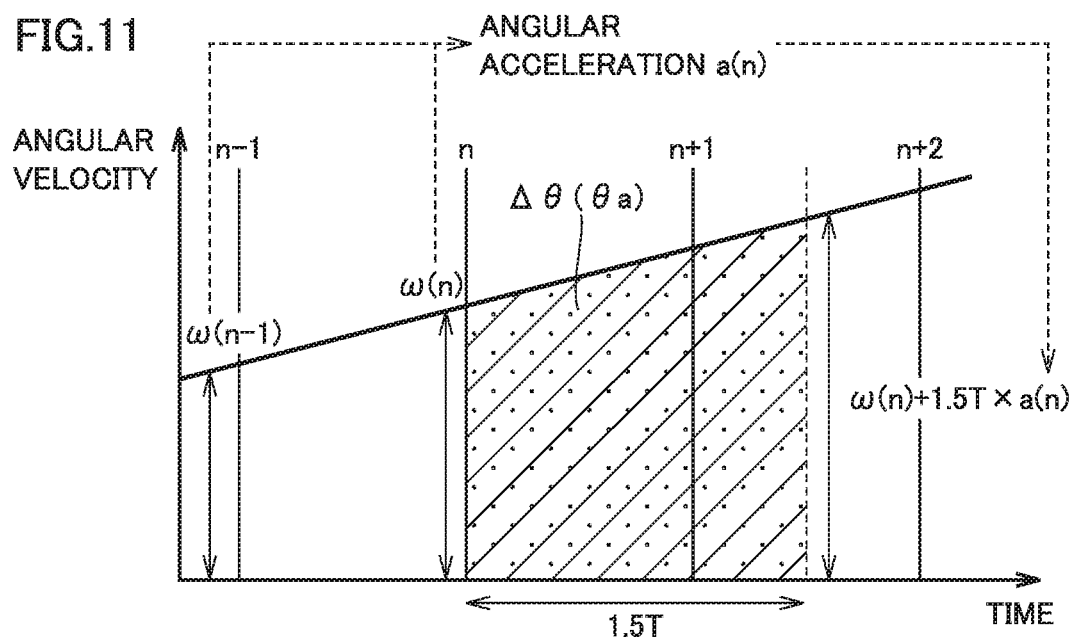
FIG. 11 is a diagram showing the relation between: an advance angle of a rotor during acceleration in a time period that is 1.5 times as long as a time length T of the control cycle; and a compensation angle in the second embodiment.

FIG. 11 is a diagram showing the relation between: advance angle θa of rotor 320 during acceleration in a time period that is 1.5 times as long as time length T of the control cycle; and compensation angle Δθ calculated in the second embodiment.

As shown in FIG. 11, compensation angle Δθ calculated by the above-described equation (4) shows a trapezoidal area (diagonally shaded region) in which (time point, angular velocity)=(n, 0), (n+1.5, 0), (n, ω(n)), and (n+1.5, ω(n)+ 1.5T×a(n)) that are included as four vertices. The trapezoidal area is the same as advance angle θa of rotor 320 in the time period that is 1.5 times as long as time length T of the control cycle (corresponding to the dot pattern region). Thereby, even if brushless DC motor 3 is under acceleration or deceleration, the motor controller can perform vector control using compensation angle Δθ more adapted to the actual movement of rotor 320. As a result, the time period required for starting or stopping brushless DC motor 3 can be shortened.

Figure 12:
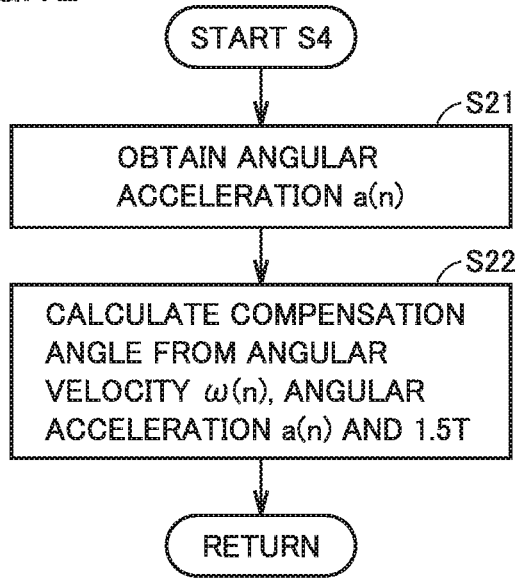
FIG. 12 is a flowchart illustrating the flow of a process of calculating a compensation amount in the second embodiment.

The process of the motor controller in the second embodiment is performed according to the flowchart shown in FIG. 9. It is to be noted that the subroutine of the process in step S4 is different from the flowchart in the first embodiment shown in FIG. 10. Referring to FIG. 12, the flow of the process of calculating a compensation amount in the second embodiment will be hereinafter described. FIG. 12 is a flowchart illustrating the flow of the process of calculating the compensation amount (step S4) in the second embodiment.

First, in step S21, compensation amount calculation unit 30 calculates (obtains) angular acceleration a(n) by the same method as that in the first embodiment.

Then, in step S22, compensation amount calculation unit 30 calculates compensation angle Δθ according to the above-mentioned equation (4) using angular velocity ω(n) at time point n, the time period that is 1.5 times as long as time length T of the control cycle (1.5 T), and angular acceleration a(n).

As described above, the compensation amount calculation unit according to the second embodiment calculates, as compensation angle Δθ, the angle by which rotor 320 advances in the time period from time point n to time point n+1.5 in the middle of the pulse output time period in the (n+1)th control cycle (control delay time period).

Magnetic pole position PS of rotor 320 at the time point in the middle of the pulse output time period in the (n+1)th control cycle shows the average position of rotor 320 in the (n+1)th control cycle. Accordingly, by calculating, as compensation angle Δθ, the angle by which rotor 320 advances during the time period from time point n to the time point in the middle of the pulse output time period in the (n+1)th control cycle, compensation angle Δθ adapted to the actual movement of rotor 320 is calculated.

Specifically, compensation amount calculation unit 30 calculates compensation angle Δθ according to the above-mentioned equation (3). Thereby, even if brushless DC motor 3 is under acceleration or deceleration, the motor controller can simply calculate compensation angle Δθ further adapted to the actual movement of rotor 320. As a result, the time period required for starting or stopping brushless DC motor 3 can be shortened.

Third Embodiment

Figure 13:
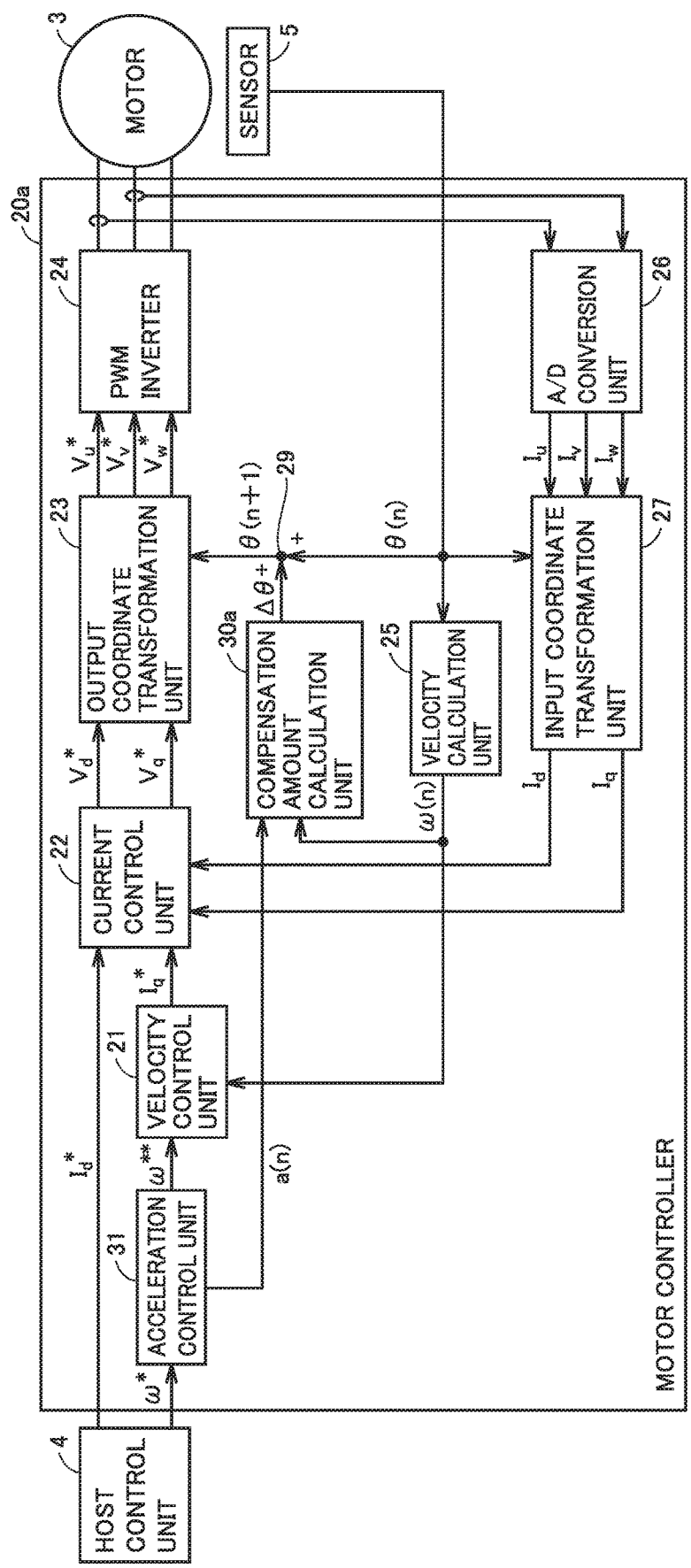
FIG. 13 is a block diagram showing the schematic configuration of a motor controller according to the third embodiment.

Referring to FIG. 13, the configuration of a motor controller 20a according to the third embodiment will be hereinafter described. FIG. 13 is a block diagram showing the schematic configuration of motor controller 20a.

As shown in FIG. 13, motor controller 20a according to the third embodiment is different from motor controller 20 shown in FIG. 7 in that this motor controller 20a includes a compensation amount calculation unit 30a in place of compensation amount calculation unit 30, and further includes an acceleration control unit 31. Since other features of motor controller 20a are the same as those of motor controller 20 shown in FIG. 7, the description thereof will not be hereinafter repeated. Compensation amount calculation unit 30a and acceleration control unit 31 are, for example, formed of a microcomputer, and implemented by a hardware processor (microprocessor) included in the microcomputer executing a program stored in its storage device.

Acceleration control unit 31 sets the target angular acceleration of rotor 320 for each control cycle such that the value of the current flowing through brushless DC motor 3 is equal to or less than a prescribed value. Specifically, based on the predetermined angular acceleration pattern showing the temporal change in the target angular velocity and velocity command value ω* received from host control unit 4, acceleration control unit 31 generates a velocity command value ω for each control cycle and outputs the generated velocity command value ω to velocity control unit 21. Thereby, PWM inverter 24 is caused to control the voltage to be applied to coils 330, 340 and 350 such that the angular acceleration of rotor 320 becomes closer to the target angular acceleration set by acceleration control unit 31.

Figure 14:
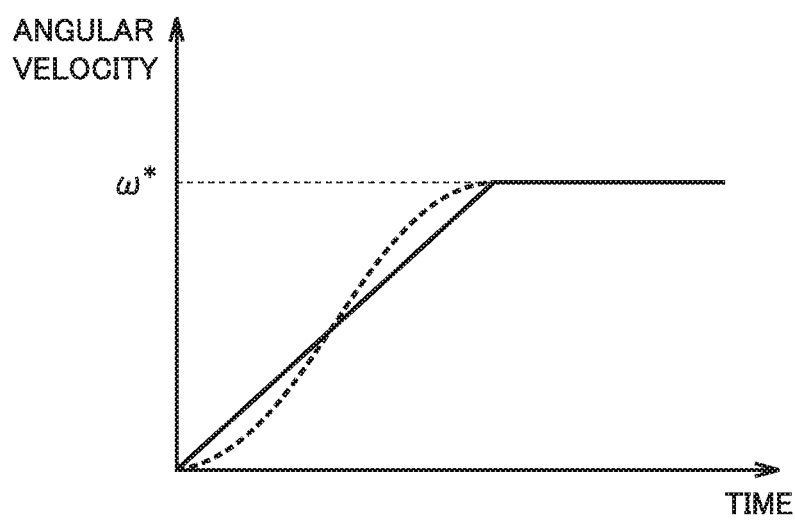
FIG. 14 is a diagram showing an example of an angular acceleration pattern at start-up of the brushless DC motor (during acceleration from a non-rotating state to a target velocity).

FIG. 14 is a diagram showing an example of the angular acceleration pattern at start-up of brushless DC motor 3 (during acceleration from a non-rotating state to a target velocity). FIG. 14 shows an example of the angular acceleration pattern at the time when velocity command value ω* is received from host control unit 4.

For example, as shown in FIG. 14, acceleration control unit 31 increases velocity command value ω over time, and outputs velocity command value ω that coincides with velocity command value ω* after a lapse of a prescribed time period. In addition, acceleration control unit 31 may increase velocity command value ω according to a fixed angular acceleration until a lapse of the prescribed time period as shown by a solid line in FIG. 14, or may increase velocity command value ω while changing the angular acceleration as shown by a dashed line in FIG. 14.

In contrast, when brushless DC motor 3 is stopped (decelerated from the rotation speed in the steady state to zero), acceleration control unit 31 decreases velocity command value ω over time, and outputs velocity command value ω of zero after a lapse of the prescribed time period.

Acceleration control unit 31 outputs, to compensation amount calculation unit 30a, angular acceleration a(n) obtained by dividing the difference of velocity command values ω** between the (n−1)th control cycle and the n-th control cycle by time length T of the control cycle.

Compensation amount calculation unit 30a is different from compensation amount calculation unit 30 in the first embodiment or the second embodiment only in that it receives angular acceleration a(n) from acceleration control unit 31. In other words, based on angular acceleration a(n) received from acceleration control unit 31, angular velocity ω(n) received from velocity calculation unit 25 and time length T of the control cycle, compensation amount calculation unit 30a determines compensation angle Δθ in the same manner as with compensation amount calculation unit 30 in the first embodiment or the second embodiment.

Figure 15:
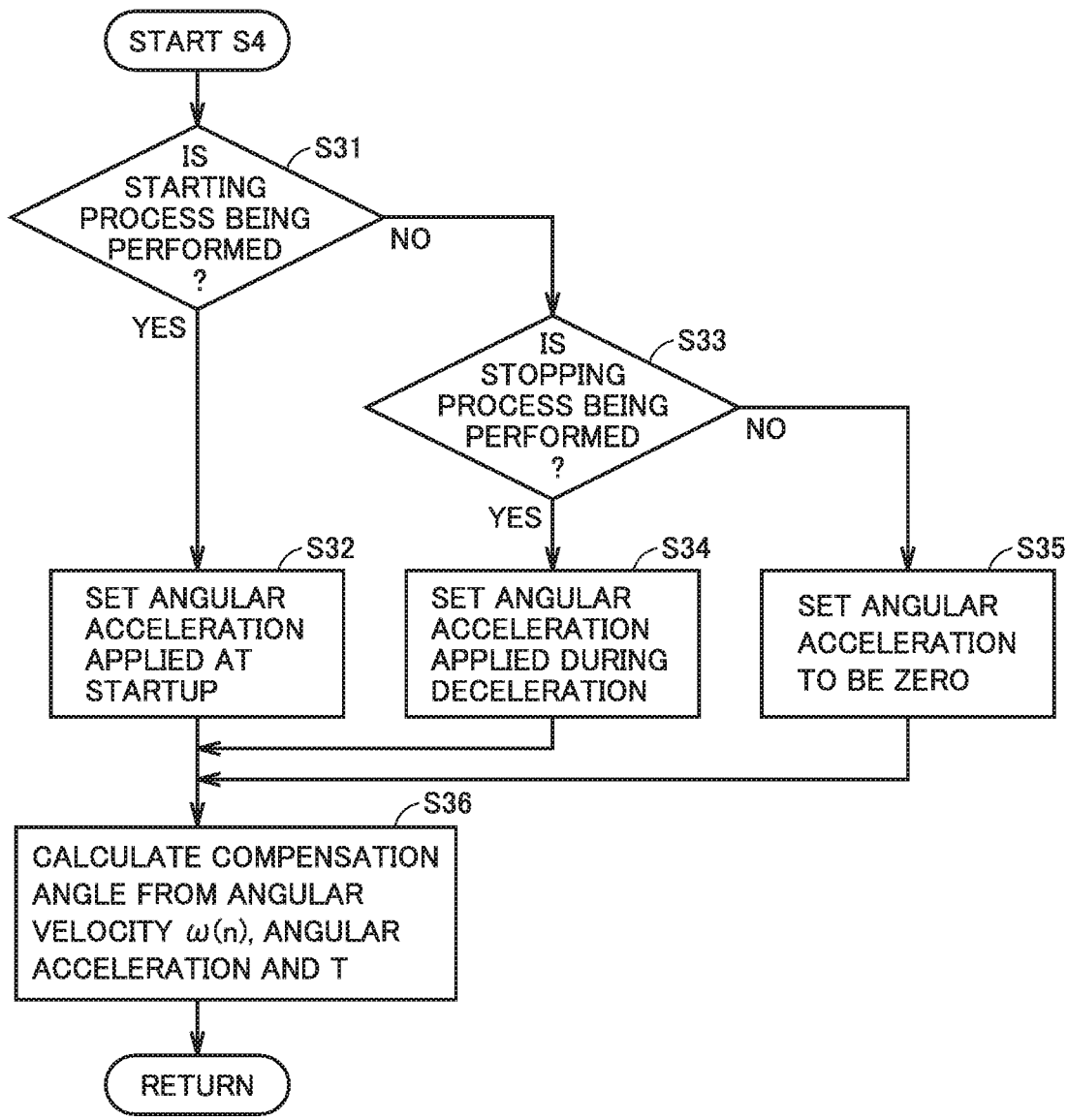
FIG. 15 is a flowchart illustrating the flow of a process of calculating a compensation amount in the third embodiment.

The process of the motor controller in the third embodiment is performed according to the flowchart shown in FIG. 9. However, the subroutine of the process in step S4 is different from the flowchart in the first embodiment shown in FIG. 10 or the flowchart in the second embodiment shown FIG. 12. Referring to FIG. 15, the flow of the process of calculating the compensation amount in the third embodiment will be hereinafter described. FIG. 15 is a flowchart illustrating the flow of the process of calculating the compensation amount (step S4) in the third embodiment.

As shown in FIG. 15, in step S31, acceleration control unit 31 first determines whether the process of starting brushless DC motor 3 is being performed or not. When the process of starting brushless DC motor 3 is being performed (YES in step S31), acceleration control unit 31 sets angular acceleration a(n) (a positive value), which is to be applied during acceleration, based on the difference of velocity command values ω** between the (n−1)th control cycle and the n-th control cycle, for example, according to the solid line or the dashed line shown in FIG. 14 (step S32). Then, acceleration control unit 31 outputs the set angular acceleration (a) to compensation amount calculation unit 30a.

When the process of starting brushless DC motor 3 is not being performed (NO in step S31), acceleration control unit 31 determines whether the process of stopping brushless DC motor 3 is being performed or not (step S33). When the process of stopping brushless DC motor 3 is being performed (YES in step S33), acceleration control unit 31 sets angular acceleration a(n) (a negative value), which is to be applied during deceleration, based on the difference of velocity command values ω** between the (n−1)th control cycle and the n-th control cycle, and then, outputs the set angular acceleration (a) to compensation amount calculation unit 30a (step S34).

When the process of stopping brushless DC motor 3 is not being performed (NO in step S33), acceleration control unit 31 sets angular acceleration (a) to be 0, and outputs the set angular acceleration a(n) to compensation amount calculation unit 30a (step S35).

Then, in step S36, by the same method as that in the first embodiment or the second embodiment, compensation amount calculation unit 30a calculates compensation angle Δθ based on angular acceleration a(n), angular velocity ω(n) and time length T of the control cycle.

As described above, motor controller 20a in the third embodiment includes acceleration control unit 31 configured to set the target angular acceleration of rotor 320. Compensation amount calculation unit 30a obtains the target angular acceleration set by acceleration control unit 31 as angular acceleration a(n) of rotor 320. This eliminates the need for performing the process of calculating angular acceleration a(n) in compensation amount calculation unit 30a.

First Modification

Acceleration control unit 31 outputs a new velocity command value ω according to a predetermined angular acceleration pattern. Thus, before the start of the (n+1)th control cycle, acceleration control unit 31 may output, to compensation amount calculation unit 30a, not only angular acceleration a(n) that is obtained by dividing the difference of velocity command values ω between the (n−1)th control cycle and the n-th control cycle by time length T of the control cycle, but also angular acceleration a(n+1) that is obtained by dividing the difference of velocity command values ω** between the n-th control cycle and the (n+1)th control cycle by time length T of the control cycle. Thereby, compensation amount calculation unit 30a can more accurately calculate compensation angle Δθ using angular acceleration a(n) and angular acceleration a(n+1).

Figure 16:
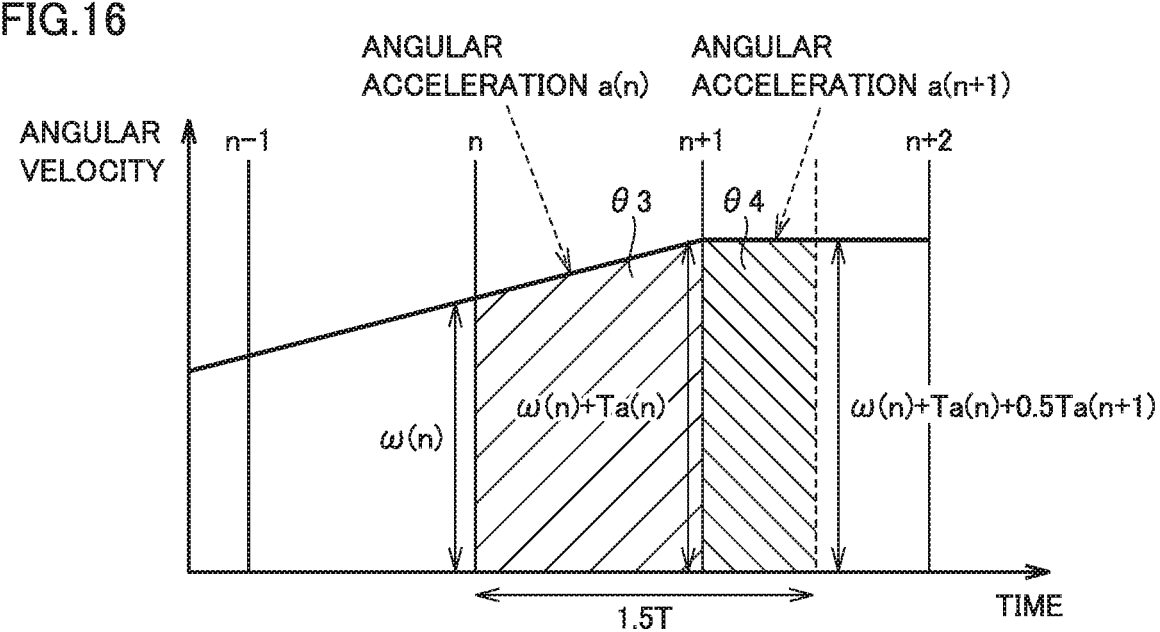
FIG. 16 is a diagram showing an example of a compensation angle Δθ calculated using an angular acceleration a(n) and an angular acceleration a(n+1).

FIG. 16 is a diagram showing an example of compensation angle Δθ calculated using angular acceleration a(n) and angular acceleration a(n+1). As shown in FIG. 16, compensation amount calculation unit 30a calculates, as compensation angle Δθ, the sum total of a compensation angle θ3 measured from time point n to time point n+1 and a compensation angle θ4 measured from time point n+1 to time point n+1.5. Specifically, compensation amount calculation unit 30a calculates compensation angle θ3 from time point n to time point n+1 according to the following equation (5), and calculates compensation angle θ4 from time point n+1 to time point n+1.5 according to the following equation (6).

$$\theta 3=\{\omega(n)+(\omega(n)+T\times a(n))\}\times T/2 \quad \text{Equation (5)}$$

$$\theta 4=\{(\omega(n)+T\times a(n))+(\omega(n)+T\times a(n)+0.5T\times a(n+1))\}\times 0.5T/2 \quad \text{Equation (6)}$$

In this way, compensation amount calculation unit 30a calculates compensation angle Δθ based on the change in the angular acceleration that is set for the time period from time point n to the middle of the pulse output time period in the (n+1)th control cycle (herein corresponding to the time period of time length 1.5 T) (a control delay time period). In other words, compensation amount calculation unit 30a calculates compensation angle Δθ based on angular acceleration a(n) in the n-th control cycle and angular acceleration a(n+1) in the (n+1)th control cycle. Thereby, compensation angle Δθ that is further adapted to the actual movement of rotor 320 can be calculated.

Second Modification

In the above description, acceleration control unit 31 is assumed to calculate, as angular acceleration a(n), the value obtained by dividing the difference of velocity command values ω between the (n−1)th control cycle and the n-th control cycle by control cycle T. However, when velocity command value ω is determined according to the angular acceleration pattern as shown by the dashed line in FIG. 14, acceleration control unit 31 may output, to compensation amount calculation unit 30a, $a_n(t)$ showing a temporal change in the angular acceleration according to the curved line from time point n to time point n+1.5, which is shown by the angular acceleration pattern. In this case, $a_n(t)$ shows a change in the angular acceleration within the control cycle.

Using $a_n(t)$, compensation amount calculation unit 30a calculates an angle by which rotor 320 advances in the time period from time point n to the time point in the middle of the pulse output time period in the (n+1)th control cycle (in this case, time point n+1.5). Then, compensation amount calculation unit 30a defines this calculated angle as compensation angle Δθ. Specifically, compensation amount calculation unit 30a only has to calculate compensation angle Δθ by integrating time period t with respect to $\omega(n)+a_n(t)\times t$ from time point n to time point n+1.5.

In this way, compensation amount calculation unit 30a obtains, as angular acceleration of rotor 320, the angular acceleration during the time period from time point n to time point n+1.5. The angular acceleration is shown by the angular acceleration pattern. Thereby, compensation angle Δθ that is further adapted to the actual movement of rotor 320 can be calculated.

Third Modification

In the above description, assuming that the representative position of rotor 320 in the (n+1)th control cycle is defined as a position at time point n+1.5 in the middle of the pulse output time period, compensation amount calculation unit 30a calculates, as compensation angle Δθ, the angle from the position of rotor 320 at time point n to this representative position.

In contrast, the intermediate position between the position of rotor 320 at time point n+1 and the position of rotor 320 at time point n+2 may be set as a representative position of rotor 320 in the (n+1)th control cycle. Compensation amount calculation unit 30a according to the third modification may calculate, as compensation angle Δθ, the angle from the position of rotor 320 at time point n (the position corresponding to an angle θ(n)) to this representative position.

Specifically, based on angular acceleration a(n) and angular acceleration a(n+1) of rotor 320, compensation amount calculation unit 30a calculates an angle by which rotor 320 advances in the time period from time point n to time point n+1 and an angle by which rotor 320 advances in the time period from time point n to time point n+2. Compensation amount calculation unit 30a calculates the average value of these two angles as compensation angle Δθ.

Figure 17:
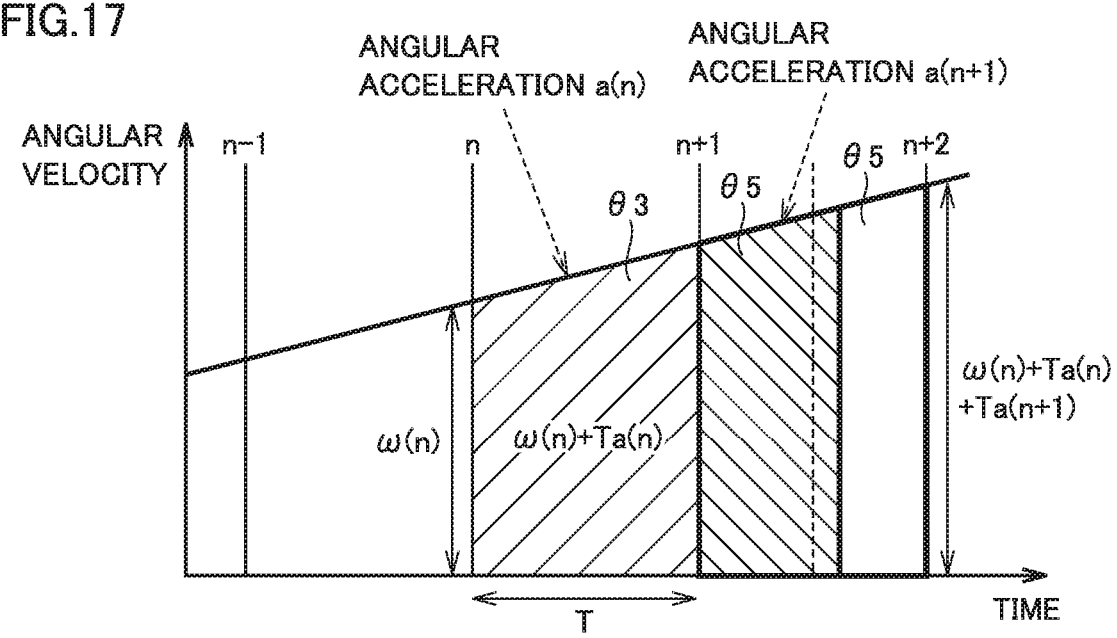
FIG. 17 is a diagram showing an example of compensation angle Δθ calculated in a modification of the third embodiment.

FIG. 17 is a diagram showing an example of compensation angle Δθ calculated in the third modification. As shown in FIG. 17, compensation amount calculation unit 30a calculates angle θ3 by which rotor 320 advances in the time period from time point n to time point n+1, according to the following equation (7).

$$\theta 3 = \{\omega(n) + (\omega(n) + T \times a(n))\} \times T/2 \qquad \text{Equation (7)}$$

Furthermore, compensation amount calculation unit 30a calculates an angle θ3+2×θ5 by which rotor 320 advances in the time period from time point n to time point n+2, according to the following equation (8).

$$\theta 3 + 2 \times \theta 5 = \{\omega(n) + (\omega(n) + T \times a(n) + T \times a(n+1))\} \times 2T/2 \qquad \text{Equation (8)}$$

In this case, θ5 shows the half of the advance angle from time point n+1 to time point n+2 during acceleration at angular acceleration a(n+1) from time point n+1 to time point n+2.

Compensation amount calculation unit 30a calculates, as compensation angle Δθ, an average value (θ3+θ5) of angle θ3 calculated by the above-mentioned equation (7) and an angle θ3+2×θ5 calculated by the above-mentioned equation (8).

In addition, the present third modification is applicable also as a modification of the second embodiment.

Fourth Embodiment

Figure 18:
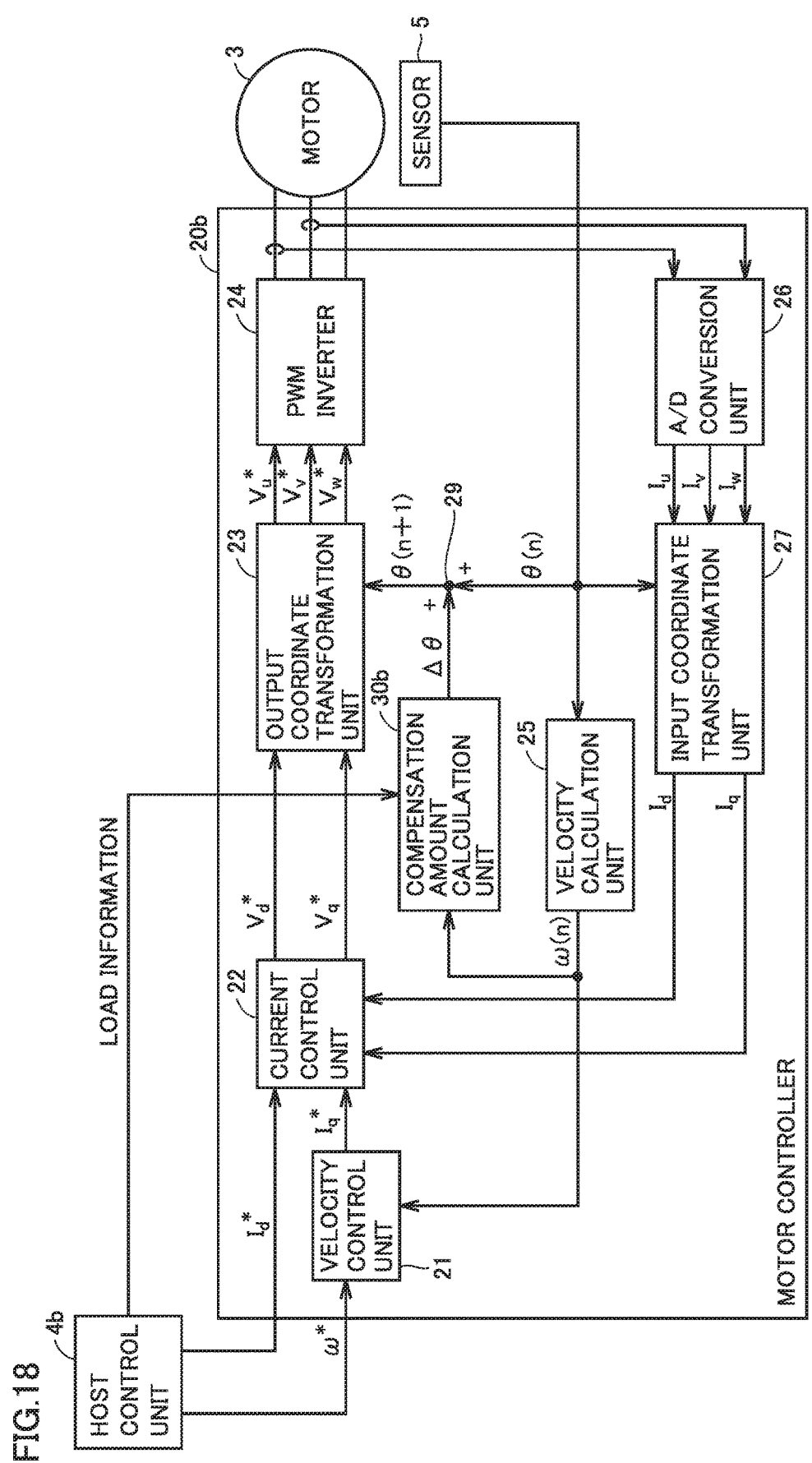
FIG. 18 is a block diagram showing the schematic configuration of a motor controller according to the fourth embodiment.

Referring to FIG. 18, the configuration of a motor controller 20b according to the fourth embodiment will be hereinafter described. FIG. 18 is a block diagram showing the schematic configuration of motor controller 20b according to the fourth embodiment.

As shown in FIG. 18, the image forming apparatus according to the fourth embodiment is different from image forming apparatus 1 according to the first embodiment in that it includes a host control unit 4b in place of host control unit 4, and includes a motor controller 20b in place of motor controller 20. Furthermore, motor controller 20b is different from motor controller 20 shown in FIG. 7 in that it includes a compensation amount calculation unit 30b in place of compensation amount calculation unit 30. Since other features of motor controller 20b are the same as those of motor controller 20 shown in FIG. 7, the description thereof will not be hereinafter repeated. Compensation amount calculation unit 30b is, for example, formed of a microcomputer, and implemented by a hardware processor (microprocessor) included in the microcomputer executing a program stored in its storage device.

Host control unit 4b outputs, to compensation amount calculation unit 30b, load information showing the magnitude of the load applied to brushless DC motor 3.

Image Forming Apparatus 1 includes a clutch for switching connection and disconnection between brushless DC motor 3 and rotating bodies (for example, intermediate transfer belt 16, paper feeding roller 17A, resist roller 17B, fixing unit 18, photoreceptors, the roller of the developing unit, and the like shown in FIG. 1). Host control unit 4b stores the clutch information showing the current clutch state (the connected state or the disconnected state) and the schedule of future switching timing Host control unit 4b generates load information showing the magnitude of the load to be applied to brushless DC motor 3 based on the clutch information, and outputs the generated load information to compensation amount calculation unit 30b. Host control unit 4 generates load information for each control cycle. Namely, host control unit 4b generates load information in the (n−1)th control cycle and load information in the n-th control cycle, and then, outputs these two pieces of load information to compensation amount calculation unit 30b before the start of the (n+1)th control cycle.

Compensation amount calculation unit 30b is different from compensation amount calculation unit 30 according to the first embodiment only in that it estimates angular acceleration a(n) in the n-th control cycle according to the load information. Compensation amount calculation unit 30b estimates angular acceleration a(n) according to the difference (the amount of change) between the magnitude of the load shown by the load information in the (n−1)th control cycle and the magnitude of the load shown by the load information in the n-th control cycle.

For example, when the load in the n-th control cycle is greater than the load in the (n−1)th control cycle, compensation amount calculation unit 30b estimates a positive angular acceleration a(n). At this time, compensation amount calculation unit 30b estimates angular acceleration a(n) such that the absolute value of angular acceleration a(n) becomes larger as the absolute value of the difference is larger. This is because, when the load applied to brushless DC motor 3 increases, the angular velocity of rotor 320 lowers, which requires acceleration in order to achieve a desired angular velocity.

In contrast, when the load in the n-th control cycle is smaller than the load in the (n−1)th control cycle, compensation amount calculation unit 30b estimates a negative angular acceleration a(n). At this time, compensation amount calculation unit 30b estimates angular acceleration a(n) such that the absolute value of angular acceleration a(n) becomes larger as the absolute value of the difference is larger. This is because, when the load applied to brushless DC motor 3 decreases, the angular velocity of rotor 320 rises, which requires deceleration in order to achieve a desired angular velocity.

Using the estimated angular acceleration a(n), compensation amount calculation unit 30b calculates compensation angle Δθ in the same manner as with the compensation amount calculation unit in any of the first embodiment to the third embodiment.

In addition, host control unit 4b may output the load information in the (n+1)th control cycle to compensation amount calculation unit 30b before the start of the (n+1)th control cycle. In this case, compensation amount calculation unit 30b only has to estimate angular acceleration a(n+1)

according to the difference (amount of change) between the magnitude of the load shown by the load information in the n-th control cycle and the magnitude of the load shown by the load information in the (n+1)th control cycle.

Fifth Embodiment

Figure 19:
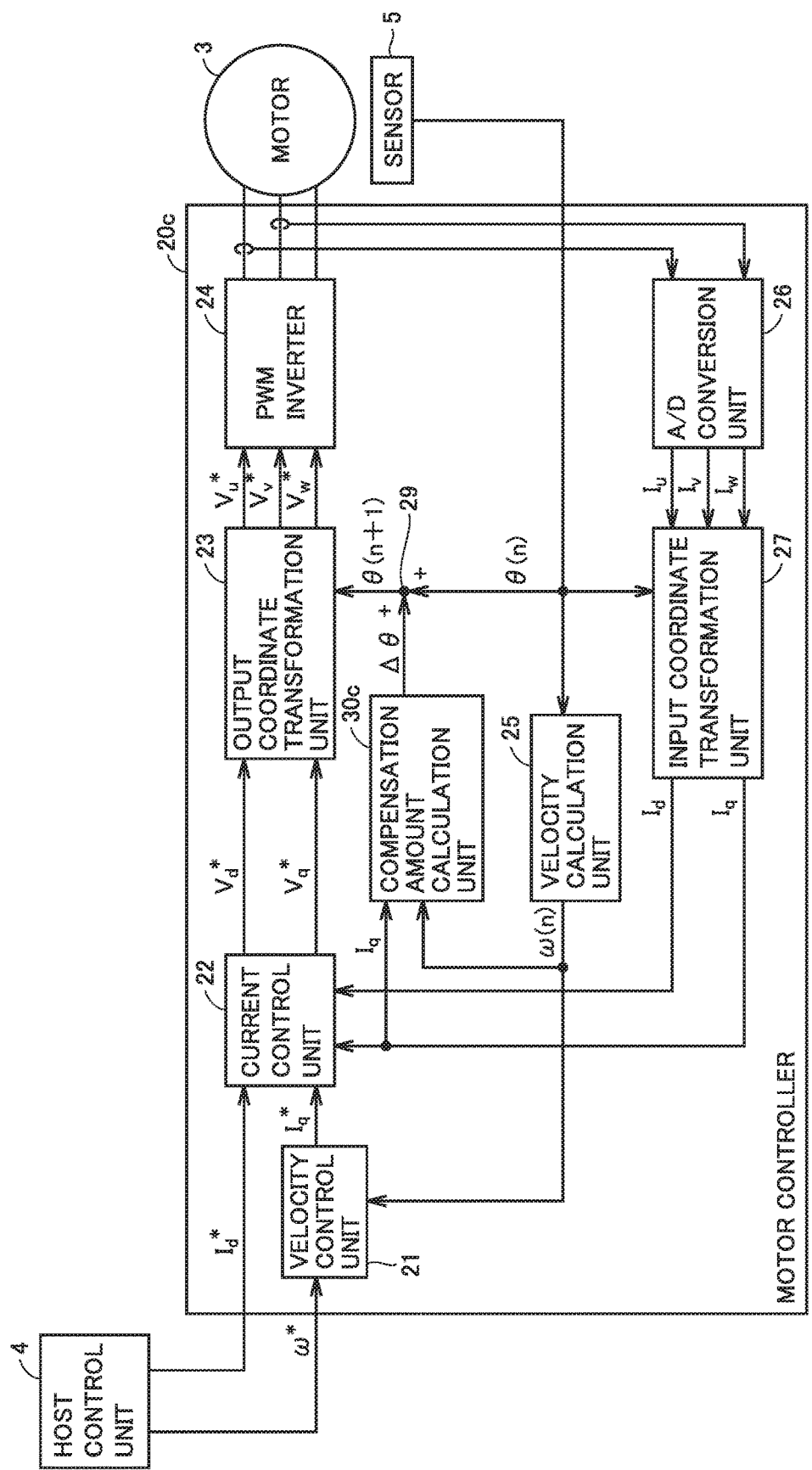
FIG. 19 is a block diagram showing the schematic configuration of a motor controller according to the fifth embodiment.

Referring to FIG. 19, the configuration of a motor controller 20c according to the fifth embodiment will be hereinafter described. FIG. 19 is a block diagram showing the schematic configuration of motor controller 20c according to the fifth embodiment.

As shown in FIG. 19, motor controller 20c is different from motor controller 20b shown in FIG. 18 in that it includes a compensation amount calculation unit 30c in place of compensation amount calculation unit 30b. Since other features of motor controller 20c are the same as those of motor controller 20b shown in FIG. 18, the description thereof will not be hereinafter repeated. Compensation amount calculation unit 30c is, for example, formed of a microcomputer, and implemented by a hardware processor (microprocessor) included in the microcomputer executing a program stored in its storage device.

Compensation amount calculation unit 30c is different from compensation amount calculation unit 30b in the fourth embodiment only in that it does not receive load information from host control unit 4 but receives a q-axis current value Iq output from input coordinate transformation unit 27 as load information.

In proportion to the load applied to brushless DC motor 3, the value of the current flowing through the coil of brushless DC motor 3 is increased. Accordingly, compensation amount calculation unit 30c can use q-axis current value Iq as load information.

Compensation amount calculation unit 30c estimates angular acceleration a(n) according to the difference (the amount of change) between q-axis current value Iq at time point n−1 and the q-axis current value at time point n.

For example, when the q-axis current value at time point n is greater than q-axis current value Iq at time point n−1, compensation amount calculation unit 30c estimates a positive angular acceleration a(n). At this time, compensation amount calculation unit 30b estimates angular acceleration a(n) such that the absolute value of angular acceleration a(n) becomes larger as the absolute value of the difference between q-axis current values Iq is larger.

In contrast, when the q-axis current value at time point n is smaller than q-axis current value Iq at time point n−1, compensation amount calculation unit 30c estimates a negative angular acceleration a(n). At this time, compensation amount calculation unit 30b estimates angular acceleration a(n) such that the absolute value of angular acceleration a(n) becomes larger as the absolute value of the difference between q-axis current values Iq is larger.

Sixth Embodiment

Figure 20:
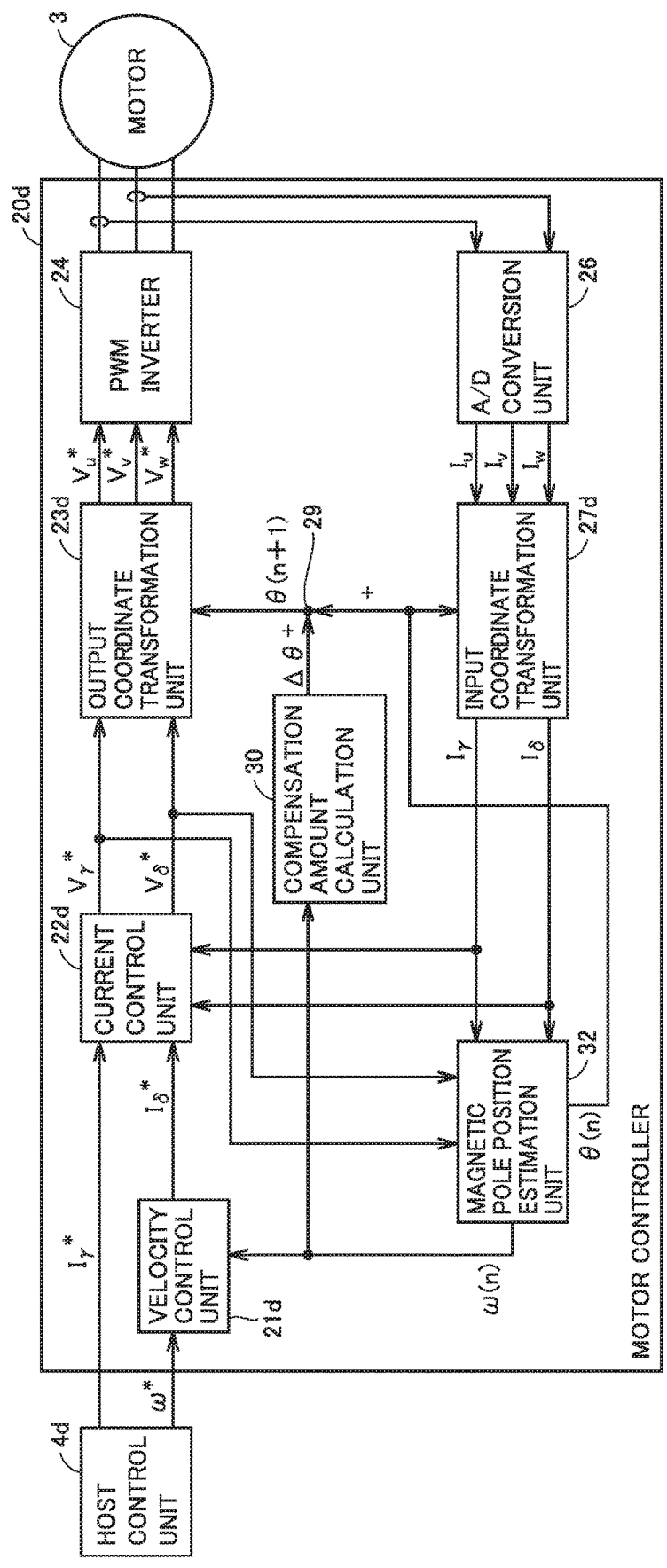
FIG. 20 is a block diagram showing the schematic configuration of a motor controller according to the sixth embodiment.

Referring to FIG. 20, the configuration of a motor controller 20d according to the sixth embodiment will be hereinafter described. FIG. 20 is a block diagram showing the schematic configuration of motor controller 20d according to the sixth embodiment.

The image forming apparatus in the sixth embodiment does not include a sensor for detecting magnetic pole position PS of rotor 320 in brushless DC motor 3. Accordingly, motor controller 20d estimates magnetic pole position PS of rotor 320 based on the value of the current flowing through the coil of brushless DC motor 3, and calculates compensation angle $\Delta\theta$ based on the estimated magnetic pole position PS.

In the sixth embodiment, compensation angle $\Delta\theta$ is calculated using a γ-δ axis coordinate system. The γ-axis shows the direction of the estimated magnetic pole position PS of rotor 320, and the δ-axis is an axis advanced by an electrical angle of π/2 with respect to the γ-axis. In other words, the γ-δ axis coordinate system is a coordinate system displaced by an angle of an estimated error from the d-q axis coordinate system.

As shown in FIG. 20, motor controller 20d includes a velocity control unit 21d, a current control unit 22d, an output coordinate transformation unit 23d, a PWM inverter 24, an A/D conversion unit 26, an input coordinate transformation unit 27d, an adder 29, a compensation amount calculation unit 30, and a magnetic pole position estimation unit 32. Since PWM inverter 24, A/D conversion unit 26, adder 29, and compensation amount calculation unit 30 are identical in configuration to those in the first embodiment, the description thereof will not be hereinafter repeated. Velocity control unit 21d, current control unit 22d, output coordinate transformation unit 23d, input coordinate transformation unit 27d, and magnetic pole position estimation unit 32 each are, for example, formed of a microcomputer, and implemented by a hardware processor (microprocessor) included in the microcomputer executing a program stored in its storage device.

Velocity control unit 21d determines a δ-axis current command value Iδ* by PI operation (proportional integral operation) such that the deviation between target angular velocity ω* from host control unit 4d and an estimated angular velocity ω(n) of rotor 320 received from magnetic pole position estimation unit 32 converges to zero.

Current control unit 22d receives a γ-axis current value Iγ and a q-axis current value Iδ at time point n from input coordinate transformation unit 27d. Current control unit 22d determines a γ-axis voltage command value Vγ* by PI operation such that the deviation between γ-axis current value Iγ and a γ-axis current command value Iγ* that is received from host control unit 4d converges to zero. Current control unit 22d determines a δ-axis voltage command value Vδ* by PI operation such that the deviation between a δ-axis current value Iδ and a δ-axis current command value Iδ* determined by velocity control unit 21d converges to zero.

By performing coordinate transformation using estimated angle θ(n+1) output from adder 29, output coordinate transformation unit 23d converts γ-axis voltage command value Vγ* and δ-axis voltage command value Vδ* that are determined by current control unit 22d into a U-phase voltage command value Vu*, a V-phase voltage command value Vv* and a W-phase voltage command value Vw*.

By performing coordinate transformation using estimated angle θ(n) obtained from magnetic pole position estimation unit 32, input coordinate transformation unit 27d converts U-phase current value Iu, V-phase current value Iv and W-phase current value Iw that are output from A/D conversion unit 26 into a γ-axis current value Iγ and a δ-axis current value Iδ.

Based on γ-axis current value Iγ and δ-axis current value Iδ that are output from input coordinate transformation unit 27d, and also based on γ-axis voltage command value Vγ* and δ-axis voltage command value Vδ* that are output from current control unit 22d, magnetic pole position estimation unit 32 estimates an estimated angle θ(n) of magnetic pole position PS of rotor 320 and an estimated velocity ω(n) of rotor 320. In other words, magnetic pole position estimation unit 32 functions as an obtaining unit for obtaining estimated angle θ(n) of magnetic pole position PS of rotor 320 and estimated velocity (n) of rotor 320 based on the value of the current flowing through each of coils 330, 340 and 350 in brushless DC motor 3. Magnetic pole position estimation unit 32 estimates estimated angle θ(n) and estimated velocity ω(n) according to the so-called voltage-current equation.

Also in the sixth embodiment, compensation amount calculation unit 30 calculates angular acceleration a(n) based on estimated angular velocity ω(n) at time point n and estimated angular velocity ω(n−1) at time point n−1, which are estimated by magnetic pole position estimation unit 32. Compensation amount calculation unit 30 calculates compensation angle Δθ using the calculated angular acceleration a(n). Thereby, even if brushless DC motor 3 is under acceleration or deceleration, motor controller 20d can perform vector control using compensation angle Δθ according to the actual movement of rotor 320. As a result, the time period required for starting or stopping brushless DC motor 3 can be shortened.

As described above, according to a control cycle, a motor controller controls a motor including: a coil that generates a rotating magnetic field; and a rotor that is formed using a permanent magnet and rotates by the rotating magnetic field generated by the coil. The motor controller includes: an obtaining unit for obtaining a magnetic pole position and an angular velocity of the rotor at a first time point; a compensation amount calculation unit for calculating a compensation angle by which the rotor advances from the first time point to a second control cycle subsequent to a first control cycle including the first time point, based on an angular acceleration of the rotor, the angular velocity of the rotor at the first time point and a time length of the control cycle; and a voltage controller for controlling a voltage to be applied to the coil such that a rotating magnetic field based on a rotation position of the rotor advanced by the compensation angle from the rotation position of the rotor at the first time point is formed in the second control cycle.

Preferably, the voltage controller controls the voltage to be applied to the coil according to PWM control. The control cycle is a PWM cycle. The compensation amount calculation unit calculates, as the compensation angle, an angle by which the rotor advances in a control delay time period from the first time point to a second time point in a middle of a pulse output time period in the second control cycle.

Preferably, when the angular velocity of the rotor at the first time point is defined as ω(n), the angular acceleration of the rotor is defined as a(n), a time length of the control delay time period is defined as Ta, and the compensation angle is defined as Δθ, the compensation amount calculation unit calculates the compensation angle according to an equation: Δθ=ω(n)×Ta+a(n)×Ta²/2.

Preferably, the first time point is a start time point of the first control cycle. A time length of the control delay time period is 1.5 times as long as the time length of the control cycle.

Preferably, the compensation amount calculation unit sets a coefficient according to the angular acceleration of the rotor, and calculates, as the compensation angle, a value obtained by multiplying the angular velocity of the rotor at the first time point by the time length of the control cycle and the coefficient. The compensation amount calculation unit sets the coefficient to be larger as the angular acceleration of the rotor is larger.

Preferably, the voltage controller controls the voltage to be applied to the coil according to PWM control. The control cycle is a PWM cycle. The first time point is a start time point of the first control cycle. A time point in a middle of a pulse output time period in the second control cycle coincides with a time point in a middle of the second control cycle. The compensation amount calculation unit sets the coefficient greater than 1.5 when the angular acceleration of the rotor is positive, and sets the coefficient less than 1.5 when the angular acceleration of the rotor is negative.

Preferably, the obtaining unit further obtains the angular velocity of the rotor at a third time point before the first time point, in which a time period between the third time point and the first time point corresponds to the time length of the control cycle. The compensation amount calculation unit calculates the angular acceleration of the rotor based on the angular velocity of the rotor at the third time point and the angular velocity of the rotor at the first time point.

Preferably, the compensation amount calculation unit obtains a target angular velocity of the rotor, and calculates the angular acceleration of the rotor based on the target angular velocity and the angular velocity of the rotor at the first time point.

Preferably, the motor controller further includes an acceleration control unit for setting a target angular acceleration of the rotor. The voltage controller controls the voltage to be applied to the coil such that the angular acceleration of the rotor becomes closer to the target angular acceleration. The compensation amount calculation unit obtains the target angular acceleration as the angular acceleration of the rotor.

Preferably, the compensation amount calculation unit calculates the compensation angle based on a change in the target angular acceleration set for the control delay time period.

Preferably, the acceleration control unit sets the target angular acceleration of the rotor for each control cycle. The compensation amount calculation unit calculates the compensation angle based on the target angular acceleration in the first control cycle and the target angular acceleration in the second control cycle, each of the target angular acceleration in the first control cycle and the target angular acceleration in the second control cycle being set by the acceleration control unit.

Preferably, the motor controller further includes an acceleration control unit for setting a target angular acceleration of the rotor according to a predetermined angular acceleration pattern showing a temporal change in the angular velocity. The voltage controller controls the voltage to be applied to the coil such that the angular acceleration of the rotor becomes closer to the target angular acceleration. The compensation amount calculation unit obtains, as the angular acceleration of the rotor, an angular acceleration in a time period from the first time point to the second control cycle, the angular acceleration being shown by the angular acceleration pattern.

Preferably, based on the angular acceleration of the rotor, the angular velocity of the rotor at the first time point and the time length of the control cycle, the compensation amount calculation unit calculates a first angle by which the rotor advances in a time period from the first time point to a start of the second control cycle and a second angle by which the rotor advances in a time period from the first time point to an end of the second control cycle. Then, the compensation amount calculation unit calculates an average value of the first angle and the second angle as the compensation angle.

Preferably, the compensation amount calculation unit obtains load information showing a magnitude of a load applied to the motor, and estimates the angular acceleration of the rotor based on a change in the magnitude of the load shown by the load information.

Preferably, the compensation amount calculation unit obtains a value of a current flowing through the coil, and estimates the angular acceleration of the rotor based on a change in the value of the current.

Preferably, the obtaining unit obtains at least one of the rotation position and the angular velocity of the rotor at the first time point from a sensor attached to the motor.

Preferably, the obtaining unit estimates the rotation position and the angular velocity of the rotor at the first time point from a value of a current flowing through the coil.

According to another aspect, an image forming apparatus includes the above-described motor controller.

According to still another aspect, a motor controlling method includes: obtaining a rotation position and an angular velocity of the rotor at a first time point; based on an angular acceleration of the rotor, the angular velocity of the rotor at the first time point and a time length of the control cycle, calculating a compensation angle by which the rotor advances from the first time point to a second control cycle subsequent to a first control cycle including the first time point; and controlling a voltage to be applied to the coil such that a rotating magnetic field based on a rotation position of the rotor advanced by the compensation angle from the rotation position of the rotor at the first time point is formed in the second control cycle.

Although embodiments of the present invention have been described and illustrated in detail, the disclosed embodiments are made for purposes of illustration and example only and not limitation. The scope of the present invention should be interpreted by terms of the appended claims.

What is claimed is:

1. A motor controller for controlling a motor according to a control cycle, the motor including a coil that generates a rotating magnetic field and a rotor that is formed using a permanent magnet and rotates by the rotating magnetic field generated by the coil, the motor controller comprising:
   a processor; and
   a voltage controller,
   the processor obtaining a rotation position and an angular velocity of the rotor at a first time point,
   based on an angular acceleration of the rotor, the angular velocity of the rotor at the first time point and a time length of the control cycle, the processor calculating a compensation angle by which the rotor advances from the first time point to a second control cycle subsequent to a first control cycle including the first time point,
   the voltage controller controlling a voltage to be applied to the coil such that a rotating magnetic field based on a rotation position of the rotor advanced by the compensation angle from the rotation position of the rotor at the first time point is formed in the second control cycle, wherein
   the processor sets a target angular acceleration of the rotor,
   the voltage controller controls the voltage to be applied to the coil such that the angular acceleration of the rotor becomes closer to the target angular acceleration, and
   the processor obtains the target angular acceleration as the angular acceleration of the rotor.

2. The motor controller according to claim 1, wherein the processor sets the target angular acceleration for each control cycle, and
   the processor calculates the compensation angle based on the target angular acceleration in the first control cycle and the target angular acceleration in the second control cycle, each of the target angular acceleration in the first control cycle and the target angular acceleration in the second control cycle being set by the processor.

3. The motor controller according to claim 1, wherein the processor obtains a value of a current flowing through the coil, and estimates the angular acceleration of the rotor based on a change in the value of the current.

4. A motor controller for controlling a motor according to a control cycle, the motor including a coil that generates a rotating magnetic field and a rotor that is formed using a permanent magnet and rotates by the rotating magnetic field generated by the coil, the motor controller comprising:
   a processor; and
   a voltage controller,
   the processor obtaining a rotation position and an angular velocity of the rotor at a first time point,
   based on an angular acceleration of the rotor, the angular velocity of the rotor at the first time point and a time length of the control cycle, the processor calculating a compensation angle by which the rotor advances from the first time point to a second control cycle subsequent to a first control cycle including the first time point,
   the voltage controller controlling a voltage to be applied to the coil such that a rotating magnetic field based on a rotation position of the rotor advanced by the compensation angle from the rotation position of the rotor at the first time point is formed in the second control cycle,
   wherein
   the voltage controller controls the voltage to be applied to the coil according to PWM control,
   the control cycle is a PWM cycle, and
   the processor calculates, as the compensation angle, an angle by which the rotor advances in a control delay time period from the first time point to a second time point in a middle of a pulse output time period in the second control cycle, and wherein
   the processor sets a target angular acceleration of the rotor,
   the voltage controller controls the voltage to be applied to the coil such that the angular acceleration of the rotor becomes closer to the target angular acceleration, and
   the processor calculates the compensation angle based on a change in the target angular acceleration set for the control delay time period.

5. A motor controller for controlling a motor according to a control cycle, the motor including a coil that generates a rotating magnetic field and a rotor that is formed using a permanent magnet and rotates by the rotating magnetic field generated by the coil, the motor controller comprising:
   a processor; and
   a voltage controller,
   the processor obtaining a rotation position and an angular velocity of the rotor at a first time point,
   based on an angular acceleration of the rotor, the angular velocity of the rotor at the first time point and a time length of the control cycle, the processor calculating a compensation angle by which the rotor advances from the first time point to a second control cycle subsequent to a first control cycle including the first time point,
   the voltage controller controlling a voltage to be applied to the coil such that a rotating magnetic field based on a rotation position of the rotor advanced by the compensation angle from the rotation position of the rotor at the first time point is formed in the second control cycle, wherein the processor sets a target angular acceleration of the rotor according to a predetermined angular acceleration pattern showing a temporal change in the angular velocity, the voltage controller controls the voltage to be applied to the coil such that the angular acceleration of the rotor becomes closer to the target angular acceleration, and the processor obtains, as the angular acceleration of the rotor, an angular acceleration in a time period from the first time point to the second control cycle, the angular acceleration being shown by the predetermined angular acceleration pattern.

6. A motor controller for controlling a motor according to a control cycle, the motor including a coil that generates a rotating magnetic field and a rotor that is formed using a permanent magnet and rotates by the rotating magnetic field generated by the coil, the motor controller comprising:

a processor; and a voltage controller, the processor obtaining a rotation position and an angular velocity of the rotor at a first time point, based on an angular acceleration of the rotor, the angular velocity of the rotor at the first time point and a time length of the control cycle, the processor calculating a compensation angle by which the rotor advances from the first time point to a second control cycle subsequent to a first control cycle including the first time point, the voltage controller controlling a voltage to be applied to the coil such that a rotating magnetic field based on a rotation position of the rotor advanced by the compensation angle from the rotation position of the rotor at the first time point is formed in the second control cycle, wherein the processor obtains load information showing a magnitude of a load applied to the motor, and estimates the angular acceleration of the rotor based on a change in the magnitude of the load shown by the load information.

7. The motor controller according to claim 6, wherein the voltage controller controls the voltage to be applied to the coil according to PWM control, the control cycle is a PWM cycle, and the processor calculates, as the compensation angle, an angle by which the rotor advances in a control delay time period from the first time point to a second time point in a middle of a pulse output time period in the second control cycle.

8. The motor controller according to claim 7, wherein when the angular velocity of the rotor at the first time point is defined as $\omega(n)$, the angular acceleration of the rotor is defined as $a(n)$, a time length of the control delay time period is defined as $Ta$, and the compensation angle is defined as $\Delta\theta$, the processor calculates the compensation angle according to an equation:

$$\Delta\theta = \omega(n) \times Ta + a(n) \times Ta^2 / 2.$$

9. The motor controller according to claim 7, wherein the first time point is a start time point of the first control cycle, and a time length of the control delay time period is 1.5 times as long as the time length of the control cycle.

10. The motor controller according to claim 6, wherein the processor sets a coefficient according to the angular acceleration of the rotor, and calculates, as the compensation angle, a value obtained by multiplying the angular velocity of the rotor at the first time point by the time length of the control cycle and the coefficient, and the processor sets the coefficient to be larger as the angular acceleration of the rotor is larger.

11. The motor controller according to claim 10, wherein the voltage controller controls the voltage to be applied to the coil according to PWM control, the control cycle is a PWM cycle, the first time point is a start time point of the first control cycle, a time point in a middle of a pulse output time period in the second control cycle coincides with a time point in a middle of the second control cycle, and the processor sets the coefficient greater than 1.5 when the angular acceleration of the rotor is positive, and sets the coefficient less than 1.5 when the angular acceleration of the rotor is negative.

12. The motor controller according to claim 6, wherein the processor further obtains an angular velocity of the rotor at a third time point before the first time point, a time period between the third time point and the first time point corresponding to the time length of the control cycle, and the processor calculates the angular acceleration of the rotor based on the angular velocity of the rotor at the third time point and the angular velocity of the rotor at the first time point.

13. The motor controller according to claim 6, wherein the processor obtains a target angular velocity of the rotor, and calculates the angular acceleration of the rotor based on the target angular velocity and the angular velocity of the rotor at the first time point.

14. The motor controller according to claim 6, wherein based on the angular acceleration of the rotor, the angular velocity of the rotor at the first time point and the time length of the control cycle, the processor calculates a first angle by which the rotor advances in a time period from the first time point to a start of the second control cycle and a second angle by which the rotor advances in a time period from the first time point to an end of the second control cycle, and the processor calculates an average value of the first angle and the second angle as the compensation angle.

15. The motor controller according to claim 6, wherein the processor obtains at least one of the rotation position and the angular velocity of the rotor at the first time point from a sensor attached to the motor.

16. The motor controller according to claim 6, wherein the processor estimates the rotation position and the angular velocity of the rotor at the first time point from a value of a current flowing through the coil.

17. An image forming apparatus comprising the motor controller according to claim 6.

18. A motor controlling method of controlling a motor according to a control cycle, the motor including a coil that generates a rotating magnetic field and a rotor that is formed using a permanent magnet and rotates by the rotating magnetic field generated by the coil, the motor controlling method comprising:

obtaining, by a processor, a rotation position and an angular velocity of the rotor at a first time point;

based on an angular acceleration of the rotor, the angular velocity of the rotor at the first time point and a time length of the control cycle, calculating, by the processor, a compensation angle by which the rotor advances from the first time point to a second control cycle subsequent to a first control cycle including the first time point; and controlling a voltage to be applied to the coil such that a rotating magnetic field based on a rotation position of the rotor advanced by the compensation angle from the rotation position of the rotor at the first time point is formed in the second control cycle, wherein
the processor obtains load information showing a magnitude of a load applied to the motor, and estimates the angular acceleration of the rotor based on a change in the magnitude of the load shown by the load information.

* * * * *